United States Patent
Kim et al.

(10) Patent No.: US 12,447,457 B2
(45) Date of Patent: Oct. 21, 2025

(54) MODULE STRUCTURE FOR PHOTOMICRO-REACTOR, PHOTOMICRO-REACTOR INCLUDING THE SAME, AND METHOD OF MANUFACTURING THE SAME

(71) Applicant: POSTECH Research and Business Development Foundation, Pohang-si (KR)

(72) Inventors: Dong-Pyo Kim, Pohang-si (KR); Gwang-Noh Ahn, Anyang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 818 days.

(21) Appl. No.: 17/751,992

(22) Filed: May 24, 2022

(65) Prior Publication Data
US 2023/0089322 A1    Mar. 23, 2023

(30) Foreign Application Priority Data

Sep. 17, 2021  (KR) .................. 10-2021-0125301
May 11, 2022  (KR) .................. 10-2022-0057611

(51) Int. Cl.
*B01J 19/00*      (2006.01)
*B01J 19/12*      (2006.01)
(Continued)

(52) U.S. Cl.
CPC ......... *B01J 19/0093* (2013.01); *B01J 19/123* (2013.01); *B01J 35/39* (2024.01);
(Continued)

(58) Field of Classification Search
CPC ........ B01J 19/00; B01J 19/0093; B01J 19/08; B01J 19/12; B01J 19/122; B01J 19/123;
(Continued)

(56) References Cited

FOREIGN PATENT DOCUMENTS

JP        5004444      8/2012
KR    10-1754251      7/2017

OTHER PUBLICATIONS

Wieland, Rapid prototyping of luminescent solar concentrator based photoreactors via 3D printing, 2016, Eindhoven University of Technology, pp. 1-73 (Year: 2016).*
Zhao et al., Reactor optimization and process intensification of photocatalyst for capillary-based PMMA LSC-photomicroreactors, Chemical Engineering Journal, 2020, 389, pp. 1-8 (Year: 2020).*
WO 2012157052 with machine translation (Year: 2012).*

(Continued)

*Primary Examiner* — Natasha E Young
(74) *Attorney, Agent, or Firm* — LEX IP MEISTER, PLLC

(57) ABSTRACT

Provided is a method of manufacturing a module structure for photomicro-reactors. The method of manufacturing a module structure for photomicro-reactors according to an aspect of the present invention, which is a method of manufacturing the module structure for photomicro-reactors inside which a reactant and a photocatalyst flow and photochemically react, includes mixing a polymer and a photoinitiator to prepare a photocurable resin, exposing one region of a surface of the photocurable resin to ultraviolet light to form a unit layer having a predetermined thickness, placing the photocurable resin on an upper side of the unit layer, and forming and stacking a plurality of the unit layers by repeatedly performing the forming of the unit layer and the placing of the photocurable resin to form the module structure.

19 Claims, 28 Drawing Sheets

(51) Int. Cl.
  *B01J 35/39* (2024.01)
  *B33Y 70/10* (2020.01)
  *B33Y 80/00* (2015.01)

(52) U.S. Cl.
  CPC ............... *B33Y 70/10* (2020.01); *B33Y 80/00* (2014.12); *B01J 2219/00828* (2013.01); *B01J 2219/00835* (2013.01); *B01J 2219/00936* (2013.01)

(58) Field of Classification Search
  CPC ... B01J 35/00; B01J 35/30; B01J 35/39; B01J 2219/00; B01J 2219/00781; B01J 2219/00819; B01J 2219/00824; B01J 2219/00828; B01J 2219/00813; B01J 2219/00835; B01J 2219/00851; B01J 2219/00871; B01J 2219/00889; B01J 2219/00891; B01J 2219/00894; B01J 2219/00925; B01J 2219/00934; B01J 2219/00936
  See application file for complete search history.

(56) References Cited

OTHER PUBLICATIONS

Gwang-Noh Ahn et al., "Chemical-Resistant Green Luminescent Concentrator-Based Photo-Microreactor via One-Touch Assembly of 3D-Printed Modules", ACS Sustainable Chem. Eng. 2022, 10, 3951-3959, Mar. 15, 2022.

KIPO, Office Action of the corresponding Korean Patent Application No. 10-2021-0125301 dated Feb. 27, 2023.

Cambié, Dario, et al. "A leaf-inspired luminescent solar concentrator for energy-efficient continuous-flow photochemistry." Angewandte Chemie International Edition 56.4 (Epub Dec. 22, 2016): 1050-1054. pp. 1-7.

Pintossi, Diego, et al. "UV-curable fluoropolymers crosslinked with functional fluorescent dyes: the way to multifunctional thin-film luminescent solar concentrators." Journal of Materials Chemistry A 5.19 (Apr. 7, 2017): 9067-9075. pp. 1-10.

Griffini, Gianmarco, Marinella Levi, and Stefano Turri. "Novel high-durability luminescent solar concentrators based on fluoropolymer coatings." Progress in Organic Coatings 77.2 (Feb. 2014): 528-536.

KIPO, Office Action of KR 10-2022-0057611 dated Mar. 15, 2024, total 13 pages.

* cited by examiner

PFPE
(Perfluoropolyether-urethane dimethacrylate)

PPO
(Phenylbis(2,4,6-trimethylbenzoyl)phosphine oxide)

ITX
(2-Isopropylthioxanthone)

C6
(Coumarin 6)

| # | Doped dye | Light source | Residence time [min] | Channel interval [mm] | Thickness [mm] | Conversion [%] |
|---|---|---|---|---|---|---|
| 1 | C6, 200 ppm | Blue LED | 25 | 3 | 3 | 88.5 |
| 2 | C6, 200 ppm | Blue LED | 25 | 2 | 3 | 85.5 |
| 3 | C6, 200 ppm | Blue LED | 25 | 1 | 3 | 64.2 |

D : Channel diameter (mm)
L : Channel interval (mm)

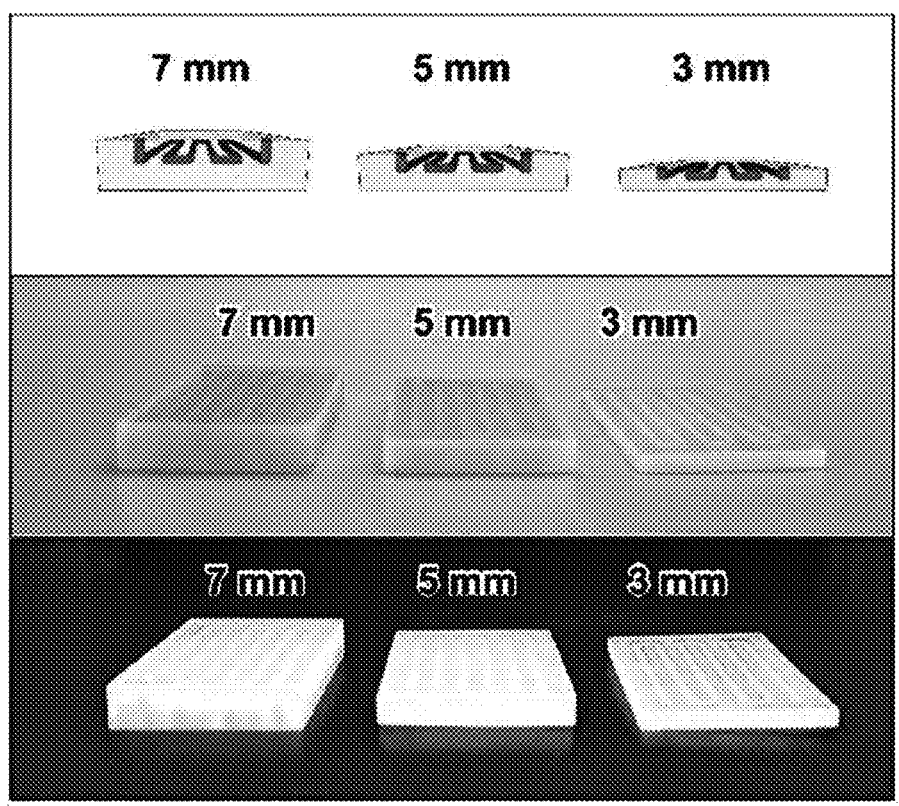
FIG. 9A
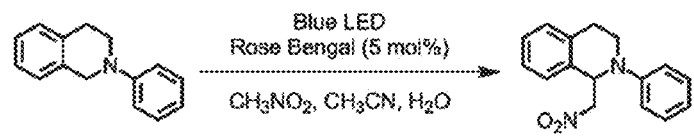
FIG. 9B
| # | Doped dye | Light source | Residence time [min] | Channel interval [mm] | Thickness [mm] | Conversion [%] |
|---|---|---|---|---|---|---|
| 1 | C6, 200 ppm | Blue LED | 25 | 3 | 7 | 47.3 |
| 2 | C6, 200 ppm | Blue LED | 25 | 3 | 5 | 65.4 |
| 3 | C6, 200 ppm | Blue LED | 25 | 3 | 3 | 88.5 |
FIG. 9C D: Channel diameter (mm)
t: Channel thickness (mm)

| # | Doped dye | Light source | Mixing pattern | Residence time [min] | Channel interval [mm] | Thickness [mm] | Conversion [%] |
|---|---|---|---|---|---|---|---|
| 1 | C6, 200 ppm | Blue LED | o | 25 | 3 | 3 | 93.4 |
| 2 | C6, 200 ppm | Blue LED | x | 25 | 3 | 3 | 88.5 |

MODULE STRUCTURE FOR PHOTOMICRO-REACTOR, PHOTOMICRO-REACTOR INCLUDING THE SAME, AND METHOD OF MANUFACTURING THE SAME

CROSS-REFERENCE TO RELATED APPLICATION

This application claims priority to and the benefit of Korean Patent Application Nos. 10-2021-0125301 filed on Sep. 17, 2021 and 10-2022-0057611 filed on May 11, 2022, the disclosures of which are incorporated herein by reference in its entirety.

BACKGROUND

1. Field of the Invention

The present invention relates to a module structure for photomicro-reactors, a photomicro-reactor including the same, and a method of manufacturing the same, and more specifically, to a module structure for photomicro-reactors, inside which a reactant and a photocatalyst flow and photochemically react, a photomicro-reactor including the same, and a method of manufacturing the same.

2. Discussion of Related Art

A photochemical reaction is a chemical reaction that occurs by the absorption of light. A photochemical reaction can occur at a high reaction rate by photocatalysts that absorb light energy to initiate a photochemical reaction and promote the photochemical reaction.

Among such photocatalysts, organic dye-based photocatalysts have been considered as alternatives to metallic photocatalysts due to their high accessibility and environmental friendliness, and a method of using sunlight having sustainability serving as a light energy source for a photochemical reaction has been considered.

Further, through a high mass flow rate and high heat transfer speed due to a high surface-to-volume ratio of a photomicro-reactor, the efficiency and speed of photochemical reactions can be improved and a shorter light path and a uniform light distribution can be provided, and thus the photochemical reactions can be accelerated.

Therefore, in the organic chemistry and pharmaceutical industries, there has been much interest in photochemical reactions using sunlight and organic dye-based photocatalysts and in photomicro-reactors in which such photochemical reactions occur.

However, the organic dye-based photocatalysts have a problem of inefficiency compared to metallic photocatalysts. Conventionally, a luminescent solar concentrator (LSC) used in a solar cell, in order to solve the above problem, has been introduced into a photomicro-reactor. An LSC is able to collect sunlight over a large area, convert the collected sunlight into light of a target wavelength, and transmit the light to a relatively small area.

Such a conventional LSC-based photomicro-reactor (LSC-PM) has been manufactured through soft lithography or a capillary embedding method by using a fluorescent dye-doped polydimethylsiloxane (PDMS) or polymethylmethacrylate (PMMA).

However, the LSC-PM manufactured using PDMS and PMMA had a problem of being destroyed by causing high swelling when exposed to most organic solvents, and had a problem in that a fluorescent dye with which the LSC-PM was doped was leached into an organic solvent due to the swelling and an organic dye-based photocatalyst was deposited on a wall of a channel inside the LSC-PM.

Further, the conventional manufacturing methods such as soft lithography and the like require multi-step processing, require much time and cost and high skill, and have a problem that are not suitable for small devices such as photomicro-reactors.

Furthermore, when a photomicro-reactor is modularized in a small size, there is a problem of a fluid leakage that may occur between a plurality of small modules and that it is not easy to arrange and align the small modules.

SUMMARY OF THE INVENTION

The present invention is directed to providing a module structure for photomicro-reactors capable of maintaining a chemically stable state even when exposed to an organic photocatalyst or an organic solvent and capable of being compatible with various organic photocatalysts or organic solvents, a photomicro-reactor including the same, and a method of manufacturing the same.

The present invention is also directed to providing a module structure for photomicro-reactors which does not require high skill in a manufacturing process and is capable of reducing a time and costs invested in the manufacturing process, a photomicro-reactor including the same, and a method of manufacturing the same.

The present invention is also directed to providing a module structure for photomicro-reactors capable of improving a conversion rate and throughput of a photochemical reaction, a photomicro-reactor including the same, and a method of manufacturing the same.

The present invention is also directed to providing module structures for photomicro-reactors capable of being arranged in a certain arrangement by itself and preventing a leakage of a fluid flowing therein, a photomicro-reactor including the same, and a method of manufacturing the same.

Objects of the present invention are not limited to the above-described object and other objects that are not described may be clearly understood by those skilled in the art from the following descriptions.

According to an aspect of the present invention, there is provided a method of manufacturing the module structure for photomicro-reactors inside which a reactant and a photocatalyst flow and photochemically react, including mixing a polymer and a photoinitiator to prepare a photocurable resin, exposing one region of a surface of the photocurable resin to ultraviolet light to form a unit layer having a predetermined thickness, placing the photocurable resin on an upper side of the unit layer, and forming and stacking a plurality of the unit layers by repeatedly performing the forming of the unit layer and the placing of the photocurable resin to form the module structure.

In the forming of the unit layer, an exposure time of the ultraviolet light may range from 5 seconds to 7 seconds.

In the forming of the unit layer, an exposure intensity of the ultraviolet light may range from 15 mW/cm$^2$ to 25 mW/cm$^2$.

The polymer may include perfluoropolyether-urethane methacrylate.

The photocurable resin may further include a fluorescent dye.

A collecting of the fluorescent dye in the photocurable resin may range from 5 ppm to 300 ppm.

The fluorescent dye may include at least one of coumarin 6, eosin-Y, fluorescein, perylene, lumogen F red, and rhodamine 6G.

The method may further include identifying chemical resistance of the photocurable resin prepared in the preparing of the photocurable resin, and optimizing design parameters of the module structure for photomicro-reactors on the basis of the chemical resistance identified in the identifying of the chemical resistance.

The method may further include, in the preparing of the photocurable resin, preparing a plurality of photocurable resins in which at least one of the polymer and the photoinitiator is different, and after the identifying of the chemical resistance is performed, selecting any one of the plurality of photocurable resins on the basis of the identified chemical resistance.

The identifying of the chemical resistance may include preparing a sample using the photocurable resin, exposing the sample to a solvent or an organic dye-based photocatalyst, and identifying physical and chemical properties of the sample, the solvent, or the organic dye-based photocatalyst caused by exposing the sample to the solvent or the organic dye-based photocatalyst.

The optimizing of the design parameters may include preparing a plurality of test subjects in which the design parameters are changed based on the identified chemical resistance, identifying photochemical reaction efficiencies of the plurality of test subjects, and optimizing the design parameters on the basis of the identified efficiencies.

According to another aspect of the present invention, there is provided a module structure for photomicro-reactors manufactured by the above-described method, including a light collecting plate having one side provided with an inlet through which a reactant and a photocatalyst are introduced, and the other side provided with an outlet through which a product generated by a photochemical reaction and the photocatalyst are discharged, and a channel formed inside the light collecting plate and connecting the inlet and the outlet.

The light collecting plate may be formed to have a polygonal plate shape.

A sealing member may be provided at at least one of the inlet and the outlet.

The inlet may be positioned at an upper surface of the light collecting plate, the outlet may be provided as a plurality of outlets, the plurality of outlets may be positioned at side surfaces of the light collecting plate, and the channel may include branch portions branched off from the inlet toward the plurality of outlets.

The inlet may be positioned at one side surface of the light collecting plate, the outlet may be positioned at the other side surface of the light collecting plate, and the channel may be formed so that a plurality of rows constituting one flow path between the outlet and the inlet are arranged in a zigzag manner.

According to still another aspect of the present invention, there is provided a photomicro-reactor including a plurality of first module structures for photomicro-reactors inside which a reactant and a photocatalyst flow and photochemically react, wherein each of the first module structures for photomicro-reactors includes a first light collecting plate having one side provided with a first inlet through which the reactant and the photocatalyst are introduced, and the other side provided with a first outlet f through which a product generated by the photochemical reaction and the photocatalyst are discharged, and a first channel formed inside the first light collecting plate and through which the first inlet and the first outlet are connected, and at least two of the plurality of first module structures for photomicro-reactors are coupled to each other so that any one first outlet of the plurality of first module structures for photomicro-reactors is connected to another first inlet of the plurality of first module structures for photomicro-reactors.

In the first module structure for photomicro-reactors, the first inlet may be positioned at one side surface of the first light collecting plate, the first outlet may be positioned at the other side surface of the first light collecting plate, a second coupling portion to be coupled to the first coupling portion of the neighboring first module structure for photomicro-reactors may be formed on the other side portion of the first light collecting plate, and at least two of the plurality of first module structures for photomicro-reactors may be coupled in a line.

The first coupling portion may include a first body that protrudes upward from the one side of the first light collecting plate, wherein the first inlet may be positioned at a side surface of the first body, and include a first magnet member provided in the first body to be adjacent to the first inlet, and the second coupling portion may include a second body that protrudes upward from the other side of the first light collecting plate, wherein the first outlet may be positioned at a side surface of the second body, and include a second magnet member provided in the second body to be adjacent to the first outlet.

The photomicro-reactor may further include a second module structure for photomicro-reactors inside which a reactant and a photocatalyst flow and photochemically react, wherein the second module structure for photomicro-reactors may include a second light collecting plate having an upper surface provided with a second inlet through which the reactant and the photocatalyst are introduced, and side surfaces provided with a plurality of second outlets through which a product generated by the photochemical reaction and the photocatalyst are discharged, and a second channel formed to be branched off from the second inlet toward the plurality of second outlets and connecting the second inlet to the plurality of second outlets, and at least two of the plurality of first module structures for photomicro-reactors may be radially coupled to the second module structure for photomicro-reactors so that any one of the plurality of second outlets is connected to any one the first inlet of the plurality of first module structures for photomicro-reactors.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 9A shows views and photographs of test subjects in which a thickness of a light collecting plate is changed, FIG. 9B is a reaction formula of a photochemical reaction that occurs inside a test subject, FIG. 9C is a table showing a thickness of the light collecting plate and a conversion rate of a photochemical reaction.

FIGS. 16A and 16B show numerical analysis and experimental results for distribution of an amount of flow of a second module structure for photomicro-reactors according to an embodiment of the present invention, wherein FIG. 16A shows a contour of a velocity field with an amount of flow of 30 µl/min obtained by numerical analysis, and FIG. 16B is a graph showing experimental results;

DETAILED DESCRIPTION OF EXEMPLARY EMBODIMENTS

Figure 1A:
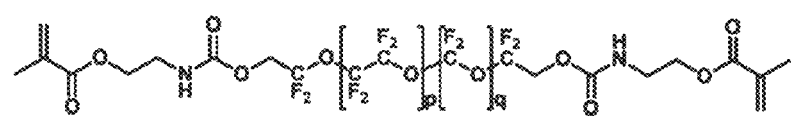
FIG. 1A shows structural formulas of perfluoropolyether-urethane methacrylate (PFPE), phenylbis phosphine oxide (PPO), 2-Isopropylthioxanthone (ITX), and coumarin 6.
Figure 1A:
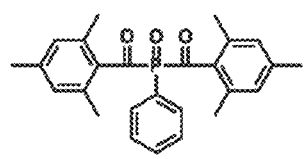
Figure 1A:
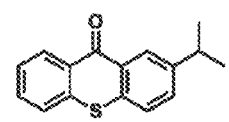
Figure 1A:
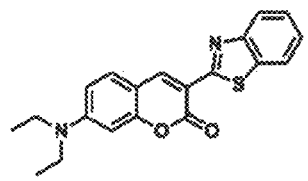

Hereinafter, embodiments of the present invention that can be easily performed by those skilled in the art will be described in detail with reference to the accompanying drawings. However, the embodiments of the present invention may be implemented in several different forms and are not limited to the embodiments described herein. In addition, parts irrelevant to description are omitted in the accompanying drawings in order to clearly explain the present invention. Similar parts are denoted by similar reference numerals throughout this specification.

Terms and words used in this specification and claims should not be interpreted as limited to commonly used meanings or meanings in dictionaries and should be interpreted with meanings and concepts which are consistent with the technological scope of the invention based on the principle that the inventors have appropriately defined concepts of terms in order to describe the invention in the best way.

It will be further understood that the terms "comprise," "comprising," "include," and/or "including," when used herein, specify the presence of stated features, integers, steps, operations, elements, and/or components, but do not preclude the presence or addition of one or more other features, integers, steps, operations, elements, components, and/or groups thereof.

When an element is referred to as being disposed "in front of," "behind," "above," or "below" another element, it includes a case in which an element is in direct contact with another element and is disposed "in front of," "behind," "above," or "below" another element and a case in which still another component is interposed between the two elements unless otherwise specified. Further, when an element is referred to as being connected to another element, it includes a case in which an element is directly connected to another element and a case in which an element is indirectly connected to another element unless otherwise specified.

First, a method of manufacturing a module structure for photomicro-reactors according to an embodiment of the present invention will be described. In the method of manufacturing the module structure for photomicro-reactors according to the embodiment of the present invention, after a photocurable resin constituting a module structure for photomicro-reactors is prepared, by preferentially identifying the chemical resistance of the photocurable resin against an organic solvent and an organic dye-based photocatalyst, a module structure for photomicro-reactors compatible with various organic photocatalysts or organic solvents may be manufactured.

Further, by manufacturing a module structure for photomicro-reactors using a three-dimensional (3D) printing method on the basis of the identified chemical resistance of the photocurable resin, a time and costs invested in a manufacturing process of the module structure for photomicro-reactors and a photomicro-reactor including the same can be reduced, and the module structure for photomicro-reactors may be manufactured in a small size.

Furthermore, by optimizing design parameters of the module structure for photomicro-reactors on the basis of the identified chemical resistance of the photocurable resin, a module structure for photomicro-reactors with improved photochemical reaction efficiency may be provided.

Meanwhile, the efficiency of the photochemical reaction is an index capable of identifying a degree to which the photochemical reaction has occurred. In an embodiment of the present invention, the efficiency of the photochemical reaction is a conversion rate of a reactant of the photochemical reaction. In this case, the conversion rate of the photochemical reaction is a ratio of the number of moles of a reactant in which the photochemical reaction is performed to the number of moles of a reactant supplied for the photochemical reaction. The conversion rate of the photochemical reaction may be expressed as a percentage in tables or graphs to be described below.

The photochemical reaction may be a chemical reaction that occurs by the absorption of light energy, and the photochemical reaction may occur at a high reaction rate using a photocatalyst. The photocatalyst is a material that absorbs light energy to initiate a photochemical reaction and promote the photochemical reaction.

In this case, the types of the photochemical reaction and the photocatalyst may be appropriately selected in consideration of the type, quantity, and concentration of a desired product. In the present embodiment, as the photochemical reaction, an Aza-Henry reaction (hereinafter, referred to as a "first reaction") for forming a carbon-carbon (C—C) bond and a reaction (hereinafter, referred to as a "second reaction") for forming a carbon-phosphorus (C—P) bond were employed. Further, as the photocatalyst, rose bengal (RB) was adopted for the first reaction and eosin-Y (EY) was adopted for the second reaction. The first reaction and the second reaction may be represented by chemical formulas shown in FIGS. 19A and 22A.

In the present embodiment, unless otherwise specified, all reagents and solvents were purchased from Sigma Aldrich (St. Louis, USA) and used without further purification.

More specifically, the method of manufacturing the module structure for photomicro-reactors according to the embodiment of the present invention includes a step (I) of preparing a resin doped with a fluorescent dye using a polymer and a fluorescent dye, a step (II) of identifying chemical resistance of the resin prepared in step (I), a step (III) of optimizing design parameters of the photomicro-reactor on the basis of the chemical resistance identified in step (II), and a step (IV) of manufacturing the module structure for photomicro-reactors on the basis of the design parameters optimized in step (III) using the resin.

Step (I)—Preparation of Resin Doped with Fluorescent Dye Using Polymer and Fluorescent Dye First, in the method of manufacturing the module structure for photomicro-reactors according to the embodiment of the present invention, the resin doped with the fluorescent dye is prepared using the polymer and the fluorescent dye [step (I)].

In this case, the resin may further include other materials in consideration of the characteristics of a manufacturing process, the physical properties of the module structure for photomicro-reactors to be manufactured, and the like. For example, the resin may be prepared as a photocurable resin further containing a photoinitiator. Further, the resin may contain all of a plurality of polymers and photoinitiators or fluorescent dyes having different chemical structures.

In this case, the polymer is a polymer in which monomers are repeatedly connected by chemical synthesis, and the photoinitiator is a material that absorbs energy from a light source made of ultraviolet light to initiate a polymerization reaction. The fluorescent dye is a material that absorbs light in a specific range of wavelengths and then emits light in a specific range of wavelengths longer than that of the absorbed light, and the photocurable resin is a synthetic organic material that is crosslinked or cured by receiving light energy such as ultraviolet light, electron beams, or the like.

In the present embodiment, the polymer is perfluoropolyether-urethane methacrylate (PFPE), the photoinitiator is phenylbis phosphine oxide (PPO) and 2-isopropylthioxanthone (ITX), and the fluorescent dye is coumarin 6 (C6). Referring to FIG. 1A, structural formulas of the PFPE, PPO, ITX, and C6 can be identified.

In the present embodiment, PFPE (Fluorolink MD 700, viscosity 581 cP) was purchased from Solvay (Milan, Italy), and PPO was purchased from BASF (Ludwigshafen, Germany). ITX and C6 were purchased from Tokyo Chemical Industry Co. Ltd. (Tokyo, Japan).

A combination of the polymer, photoinitiator, and fluorescent dye described above is only a non-limiting example, and various types of polymers, photoinitiators, or fluorescent dyes may be used. Further, the polymer, photoinitiator, and fluorescent dye used in the preparation of the photocurable resin may be selected by various methods.

More specifically, the fluorescent dye may be selected by comparing absorption and emission spectra of the fluorescent dye with an absorption spectrum of the photocatalyst of the photochemical reaction or with a wavelength of ultraviolet (UV) light used in a 3D printing process to be described below.

In the latter case, when the absorption spectrum of the fluorescent dye is similar to a wavelength range of the UV light in the 3D printing process, the fluorescent dye may absorb the UV light and affect a photocuring reaction. In consideration of the above effect, when the fluorescent dye is used as a light absorbent of unnecessary UV light, it is possible to optimize the 3D printing process.

Figure 2A:
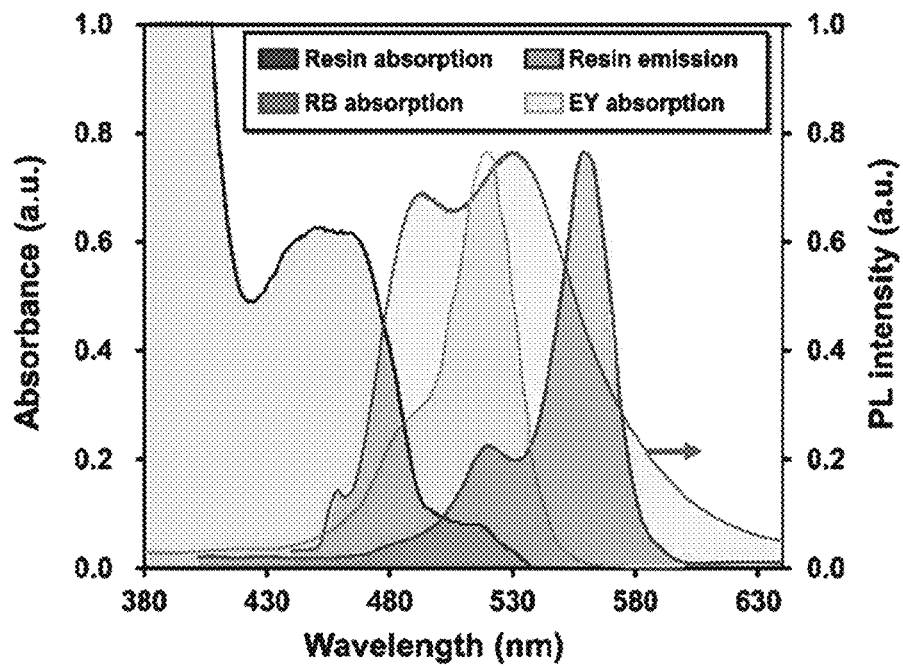
FIG. 2A is a graph for comparing absorption and emission spectra of a light collecting plate 3D-printed, an absorption spectrum of rose bengal, and an absorption spectrum of eosin-Y by using a coumarin 6-doped PFPE-based resin.
Figure 2B:
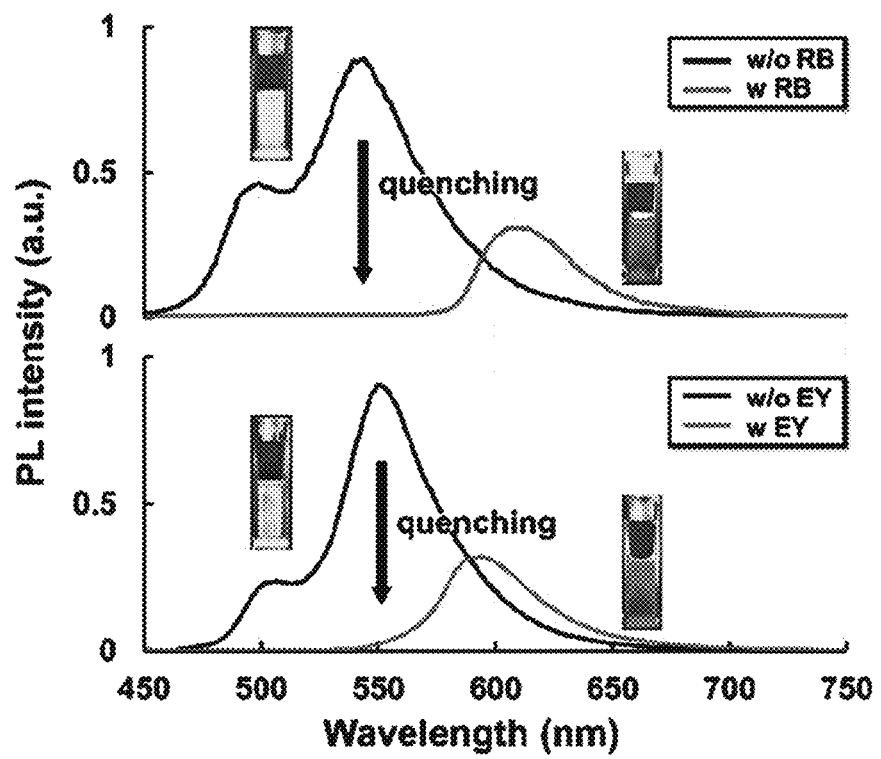
FIG. 2B shows graphs showing quenching of light emission by rose bengal and eosin-Y.

Referring to FIG. 2A, it can be confirmed that an emission spectrum (Resin emission) of the resin containing C6 and absorption spectra (RB absorption and EY absorption) of RB and EY, which are photocatalysts, were mostly identical. Further, referring to FIG. 2B, it can be confirmed that an emission spectrum of a PFPE resin containing C6 was quenched (photoluminescence quenching) by RB and EY. Therefore, in the present embodiment, the photochemical reaction by the photocatalysts EY and RB can be promoted by the absorption and emission of sunlight by the fluorescent dye C6.

As another example, the fluorescent dye may include at least one of EY, fluorescein, perylene, lumogen F red, and rhodamine 6G.

Since EY has a maximum absorption spectrum of about 500 nm and a maximum emission spectrum of about 545 nm, the EY is highly compatible with a photocatalyst having a maximum absorption spectrum of about 545 nm among photocatalysts.

Since lumogen F red has a maximum absorption spectrum of about 574 nm and a maximum emission spectrum of about 605 nm and fluorescein has a maximum absorption spectrum of about 490 nm and a maximum emission spectrum of about 575 nm, the lumogen F red and the fluorescein are compatible with methylene blue among photocatalysts having an absorption spectrum of about 500 nm to 700 nm.

Since perylene has a maximum absorption spectrum of about 430 nm and a maximum emission spectrum of 440 nm, the perylene will help to optimize the 3D printing process when a photocuring reaction induced in the 3D printing process to be described below is induced by UV light having a wavelength of about 440 nm.

Since rhodamine 6G has a maximum absorption spectrum of about 525 nm and a maximum emission spectrum of about 560 nm, the rhodamine 6G is highly compatible with a photocatalyst having a maximum absorption spectrum of about 560 nm among photocatalysts.

Further, in the method of manufacturing the photomicro-reactor for photomicro-reactors according to the embodiment of the present invention, in step (I), a plurality of resins in which at least one of a polymer and a fluorescent dye has a different type may be prepared.

In the present embodiment, in addition to a photocurable resin (hereinafter, referred to as a "first resin") containing PFPE serving as a polymer, a resin (hereinafter, referred to as a "second resin") containing PDMS serving as a polymer and a resin (hereinafter, referred to as a "third resin") containing PMMA serving as a polymer were further prepared. In this case, the first to third resins contain C6 serving as a fluorescent dye.

Meanwhile, in the method of manufacturing the photomicro-reactor for photomicro-reactors according to the embodiment of the present invention, a step of optimizing the 3D printing process may be performed based on the photocurable resin prepared in step (I).

In the present embodiment, Asiga Pico 2 (Asiga, Australia) was used as a digital light processing (DLP) desktop printer with a wavelength of 385 nm and an intensity of 20.0 mW/cm$^2$ in the 3D printing process. Absorption and emission spectra of the resin were obtained using UV-Vis spectroscopy (NanoDrop™ 2000c, Thermo Fisher Scientific) and photoluminescence spectroscopy (FP-6500, JASCO).

The optimization of the 3D printing process may be achieved by controlling various process variables. The process variables may include an exposure time, a wavelength, and an intensity of UV light, adoption of a photoinitiator, a concentration of the photoinitiator, adoption of a fluorescent dye, a concentration of the fluorescent dye, a thickness of one layer formed by 3D printing, and the like.

In this case, the concentration of the photoinitiator may range from 3 mg/ml to 12 mg/ml, preferably, about 6 mg/ml, according to a general mixing ratio. In the present embodiment, PPO and ITX were mixed at a concentration of 6 mg per 1 ml of resin.

The concentration of the fluorescent dye may range from 5 ppm to 300 ppm, preferably, 150 ppm to 250 ppm. In the present embodiment, C6, which is a fluorescent dye, was mixed at 200 ppm. When the concentration of the fluorescent dye ranges from 150 ppm to 250 ppm, the fluorescent dye may absorb a portion of UV light, and thus a penetration depth of UV light may be appropriately adjusted. Accordingly, excessive photocuring of the photocurable resin can be prevented, and a vertical resolution in the 3D printing process can be increased.

The intensity of UV light may range from 0.1 mW/cm$^2$ to 50 mW/cm$^2$, preferably, 15 mW/cm$^2$ to 25 mW/cm$^2$. When the intensity of UV light is strong, deformation or destruction of fluorescent dye molecules in the photocurable resin may occur. The inventors have identified that, when the intensity of UV light is controlled within the above range, a photocuring reaction is effectively induced without destruction or deformation of fluorescent dye molecules. In the present embodiment, the intensity of UV light was controlled to be about 20 mW/cm$^2$.

The type of the photoinitiator and the type of the fluorescent dye may be selected by comparing the spectrum of the UV light emitted from the printer and the absorption spectra of the photoinitiator and the fluorescent dye. In this case, the photoinitiator having an absorption spectrum similar to the spectrum of the UV light emitted from the printer may be selected. Accordingly, most of the UV light emitted from the printer may be absorbed by the photoinitiator so that a polymerization reaction may occur smoothly and the 3D printing process may be performed.

Figure 1B:
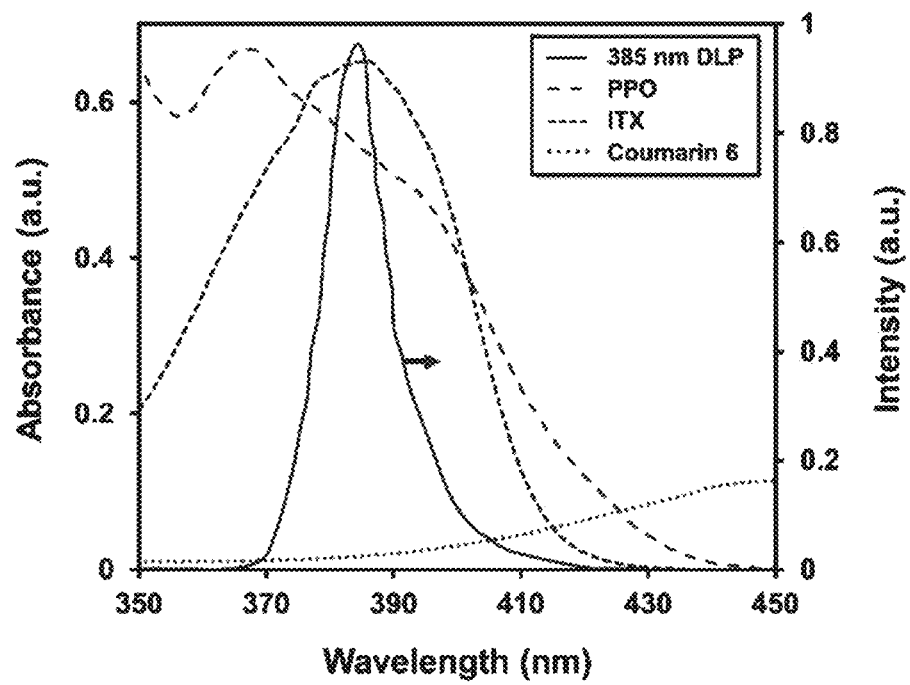
FIG. 1B is a graph for comparing a spectrum of light emitted from a ultraviolet (UV) light emitting diode (LED) of a three-dimensional (3D) printer (e.g., Agisa Pico2) and absorption spectra of PPO, ITX, and coumarin 6.
Figure 1C:
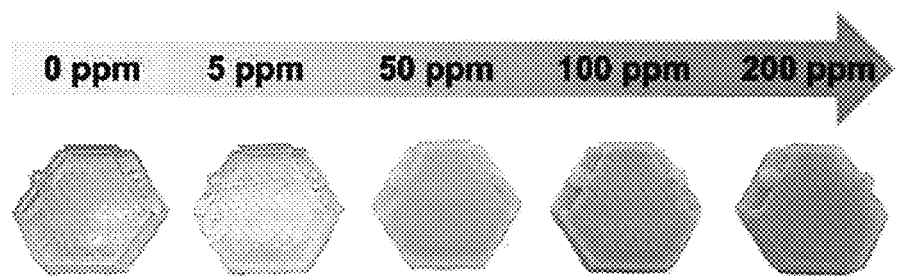
FIG. 1C is a photograph of structures 3D-printed according to a concentration of coumarin 6 contained in a photocurable resin.

Referring to FIG. 1B, most of the spectrum (385 nm DLP) of the UV light emitted from the printer is included in the absorption spectra of PPO and ITX, and only a part of the spectrum of the UV light emitted from the printer is included in the absorption spectrum of the C6. Therefore, most of the UV light emitted from the printer may be absorbed by the PPO and the ITX, and thus the polymerization reaction may occur smoothly.

Figure 1D:
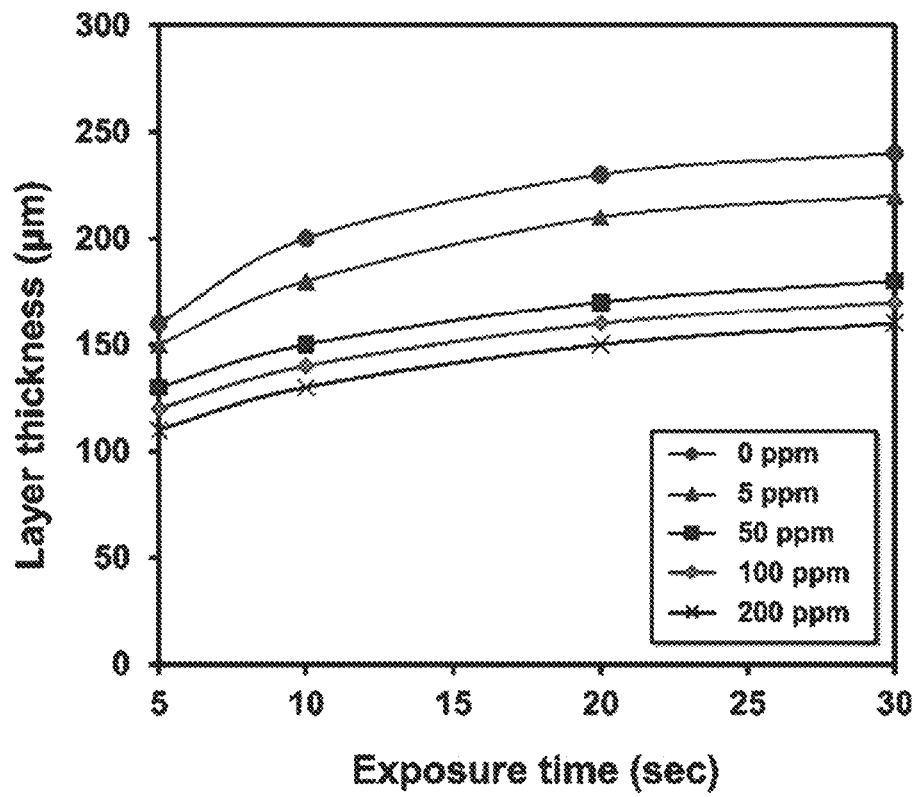
FIG. 1D is a graph for comparing thicknesses of layers of PFPE-based resins containing coumarin 6 with various concentrations according to an exposure time of UV light.
Figure 1E:
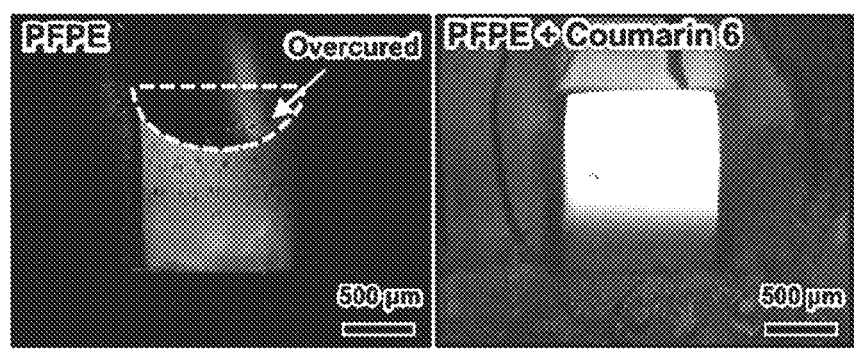
FIG. 1E shows photographs of a channel structure 3D-printed using a photocurable resin containing coumarin 6 and a channel structure 3D-printed using a photocurable resin not containing coumarin 6.

Meanwhile, the concentration of the fluorescent dye may affect a thickness of a unit layer (or cured layer) generated by the photocuring reaction according to the exposure time of the UV light. Referring to FIG. 1D, the thickness of the unit layer according to the concentration of the C6 and the exposure time of the UV light can be identified. With reference to the above, it is possible to optimize the concentration of the fluorescent dye and the exposure time of the UV light suitable for a desired thickness of the unit layer.

The thickness of the unit layer generated by the photocuring reaction may range from 20 μm to 100 μm, preferably, 30 μm to 70 μm. When the thickness of the generated unit layer ranges from about 30 μm to 70 μm, it is possible to increase the speed and efficiency of the process and form a channel structure inside the module structure for photomicro-reactors to be described below. In the present embodiment, the thickness of the generated unit layer was controlled to be about 50 μm.

Further, as described above, the fluorescent dye may affect the curing of the photocurable resin. Referring to FIG. E, when the exposure time of the UV light is 6 seconds, it can be confirmed that, when 200 ppm of C6 is mixed with a PFPE resin, a fine channel structure is formed, and when C6 is not included, an overcure occurs in an upper side of the channel structure. Meanwhile, the inventors have identified that, when 200 ppm of C6 is mixed with a PFPE resin, the C6 prevents an overcure of the resin, and when the exposure time exceeds 6 seconds, an overcure occurs. Further, it can be confirmed that, when the exposure time of the UV light is 6 seconds, a channel structure may be manufactured without overcuring.

Meanwhile, the exposure time of the UV light may be optimized in additional consideration of a manufacturing time (i.e., a time required for the 3D printing process). For example, the exposure time of the UV light may be optimized to the shortest exposure time required to manufacture the channel structure in order to shorten the manufacturing time.

In this way, the exposure time of the UV light may range from 3 seconds to 9 seconds, preferably, 5 to 7 seconds. The inventors were able to achieve a fine channel structure and optimization of a process speed while preventing an overcure of a resin by controlling an exposure time of UV light to about 5 to 7 seconds. In the present embodiment, the exposure time of the UV light was controlled to be about 6 seconds.

Step (II)—Identifying Chemical Resistance of Resin Prepared in Step (I)

In the method of manufacturing the module structure for photomicro-reactors according to the embodiment of the present invention, after step (I) is performed, the chemical resistance of the resin prepared in step (I) is identified [step (II)].

In step (II), a step (II-1) of preparing a sample using the resin, a step (II-2) of exposing the sample to a solvent or a photocatalyst, and a step (II-3) of identifying physical and chemical properties of the sample, the solvent, or the photocatalyst caused by exposing the sample to the solvent or the photocatalyst may be performed. In this case, the solvent or the photocatalyst may be an organic solvent or an organic dye-based photocatalyst.

The physical and chemical properties of the sample, the solvent, or the photocatalyst may be variously determined according to the photochemical reaction, the resin, the structure of the module structure for photomicro-reactors, the light incident on the module structure for photomicro-reactors, and the like. Further, the identifying of the physical and chemical properties of the sample, the solvent, or the photocatalyst includes identifying a change in the physical and chemical properties of the sample, solvent, or photocatalyst caused by exposing the sample to the solvent or photocatalyst.

In the present embodiment, the physical and chemical properties of the sample include swelling of the sample exposed to the solvent, leaching of the fluorescent dye from the sample, or coloration of the sample by the organic dye-based photocatalyst.

In this case, step (II-1) may include preparing a plurality of samples using the first to third resins. The shape and number of the samples prepared in step (II-1) may be determined in consideration of steps (II-2) and (II-3). More specifically, in order to check the swelling of the sample exposed to the solvent, first to third samples may be made of the first to third resins. In order to check the leaching of the fluorescent dye from the sample, fourth to sixth samples may be made of the first to third resins. In order to check the coloration of the sample by the organic dye-based photocatalyst, seventh to ninth samples may be made of the first to third resins.

Hereinafter, the preparing processes of the first to ninth samples will be described in more detail. A cube (hereinafter, referred to as a "first sample") having a size of 5 mm×5 mm×5 mm is 3D-printed using the first resin. SYLGARD 184 Base and a curing agent are mixed with the second resin at a ratio of 9:1 by weight %, the second resin is polymerized at 70° C. for 120 minutes, a cube is 3D-printed using the second resin and then the cube is cut to the same size as the first sample (hereinafter, referred to as a "second sample"). In this case, bubbles generated during the mixing process may be removed using a desiccator and a vacuum pump. A cube (hereinafter, referred to as a "third sample") having the same size as the first sample is 3D-printed using the third resin. In this case, air bubbles and solvents that may generate in the third resin may be removed using a rotor evaporator.

In this case, masses of the first to third samples are measured in advance using a precision balance. In an embodiment of the present invention, as the precision balance, ME54 (Mettler Toledo, OH, United States of America) was used.

The fourth to sixth samples were prepared by the same method as the method of preparing the first to third samples.

A slide glass (hereinafter, referred to as a "seventh sample") coated with the first resin at a thickness of 30 μm is prepared. The same process is performed on the second and third resins (hereinafter, referred to as an "eighth sample" and a "ninth sample," respectively).

Thereafter, in step (II-2), exposing the first to sixth samples to a plurality of organic solvents and exposing the seventh to ninth samples to a plurality of solutions containing an organic solvent and an organic dye-based photocatalyst are performed.

More specifically, exposing each of the first to third samples to 2 ml of a plurality of organic solvents for 72 hours and then lightly drying the solvents, exposing the fourth to sixth samples to a plurality of solvents for 72 hours, and exposing the seventh to ninth samples to the plurality of solutions containing the organic solvent and the organic dye-based photocatalyst for 12 hours are performed.

In the present embodiment, the plurality of organic solvents include acetonitrile, tetrahydrofuran (THF), acetone, ethanol, chloroform, dichloromethane (DCM), dimethylformamide (DMF), dimethyl sulfoxide (DMSO), nitromethane, and diethyl phosphite.

Further, the organic dye-based photocatalyst may include an organic dye-based photocatalyst for a photochemical reaction. In the present embodiment, the plurality of solutions containing the organic solvent and the organic dye-based photocatalyst include a solution (hereinafter, referred to as a "first solution") containing RB, acetonitrile, and nitromethane, and a solution (hereinafter, referred to as "second solution") containing EY, acetonitrile, and nitromethane.

Thereafter, in step (II-3), identifying swelling of the sample exposed to the organic solvent, identifying leaching of the fluorescent dye from the sample, and identifying coloration of the sample by the organic dye-based photocatalyst are performed.

In this case, in the identifying of the swelling of the sample exposed to the organic solvent, identifying the deformation of the first to third samples exposed to the organic solvents or comparing messes of the first to third samples before exposed to the organic solvents with messes of the first to third samples after exposed to the organic solvents is performed.

Figure 3A:
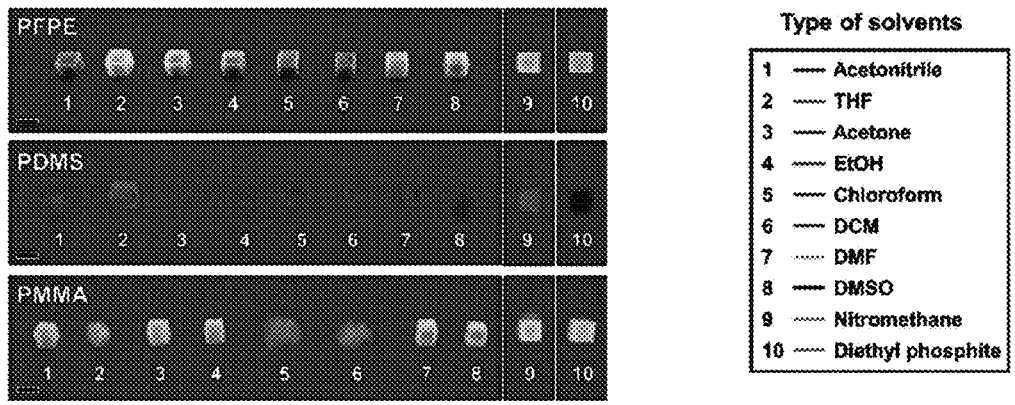
FIG. 3A is a photograph showing changes in shape and color of a PFPE sample, a polymethylmethacrylate (PMMA) sample, and a polydimethylsiloxane (PDMS) sample which are exposed to various solvents.
Figure 3B:
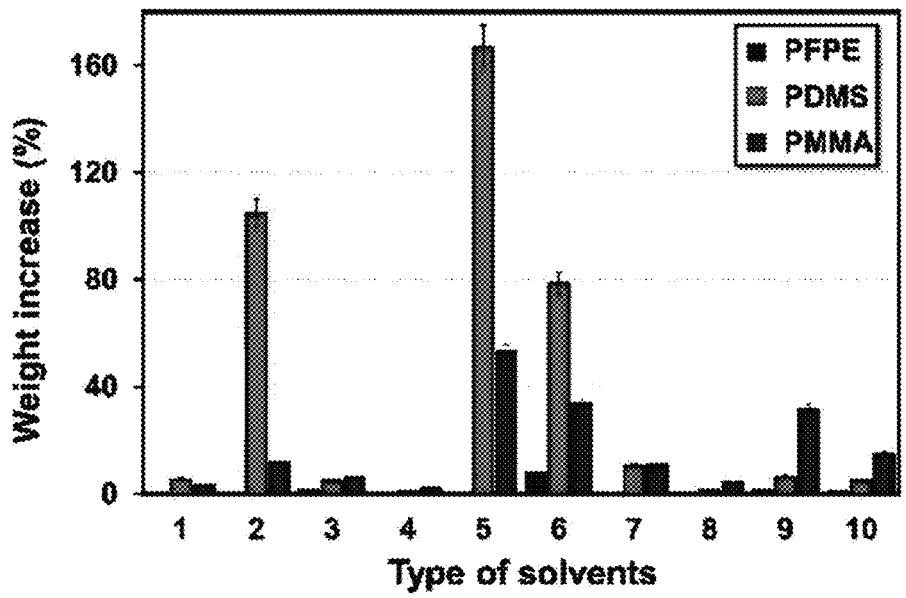
FIG. 3B is a graph showing weight increases of a PFPE sample, a PMMA sample, and a PDMS sample which are exposed to various solvents, and FIG. 3C are UV-visible spectrophotometry (UV-Vis) spectra showing leaching degrees of coumarin 6 leached from samples to solvents.
Figure 4A:
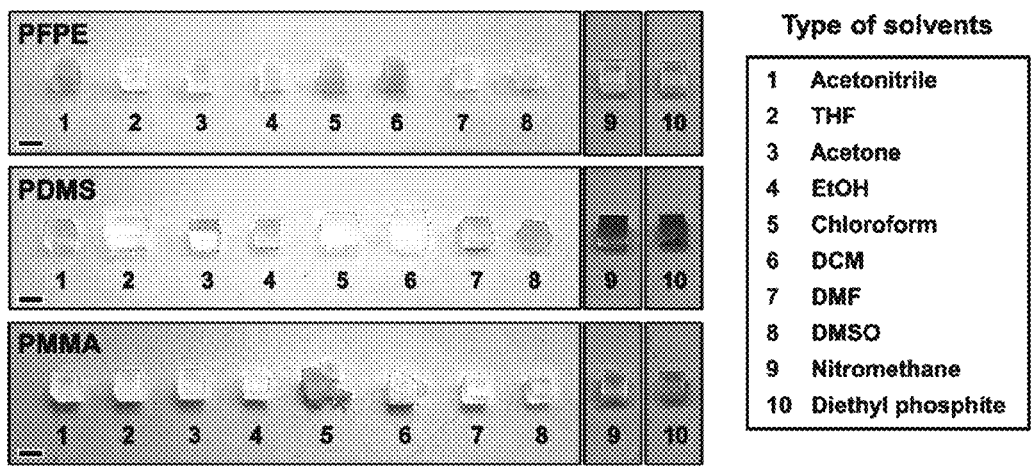
FIG. 4A shows photographs in which changes in shape of a PFPE sample, a PMMA sample, and a PDMS sample doped with coumarin 6 exposed to various solvents are visually identified.

Referring to FIGS. 3A and 4A, it can be confirmed that the first sample exposed to the organic solvent has less volume increase or damage than the second and third samples exposed to the organic solvent. Referring to FIG. 3B, it can be confirmed that a change in mass of the first sample exposed to the organic solvent is smaller than a change in mass of the second and third samples exposed to the organic solvent. Therefore, it can be confirmed that the first sample exposed to the organic solvent has less swelling than the second and third samples exposed to the organic solvents.

Meanwhile, in the identifying of the leaching of the fluorescent dye from the sample, the discoloration of the plurality of organic solvents exposed to the fourth to sixth samples is visually identified, and spectra of the plurality of organic solvents exposed to the fourth to sixth samples are identified using UV-Vis spectroscopy.

Figure 3C:
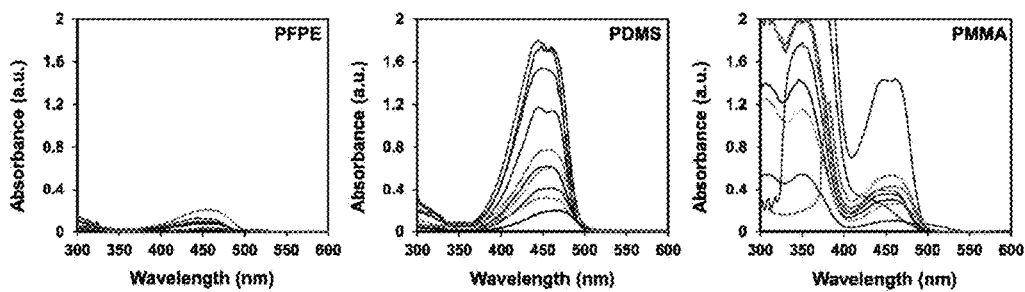
Figure 4B:
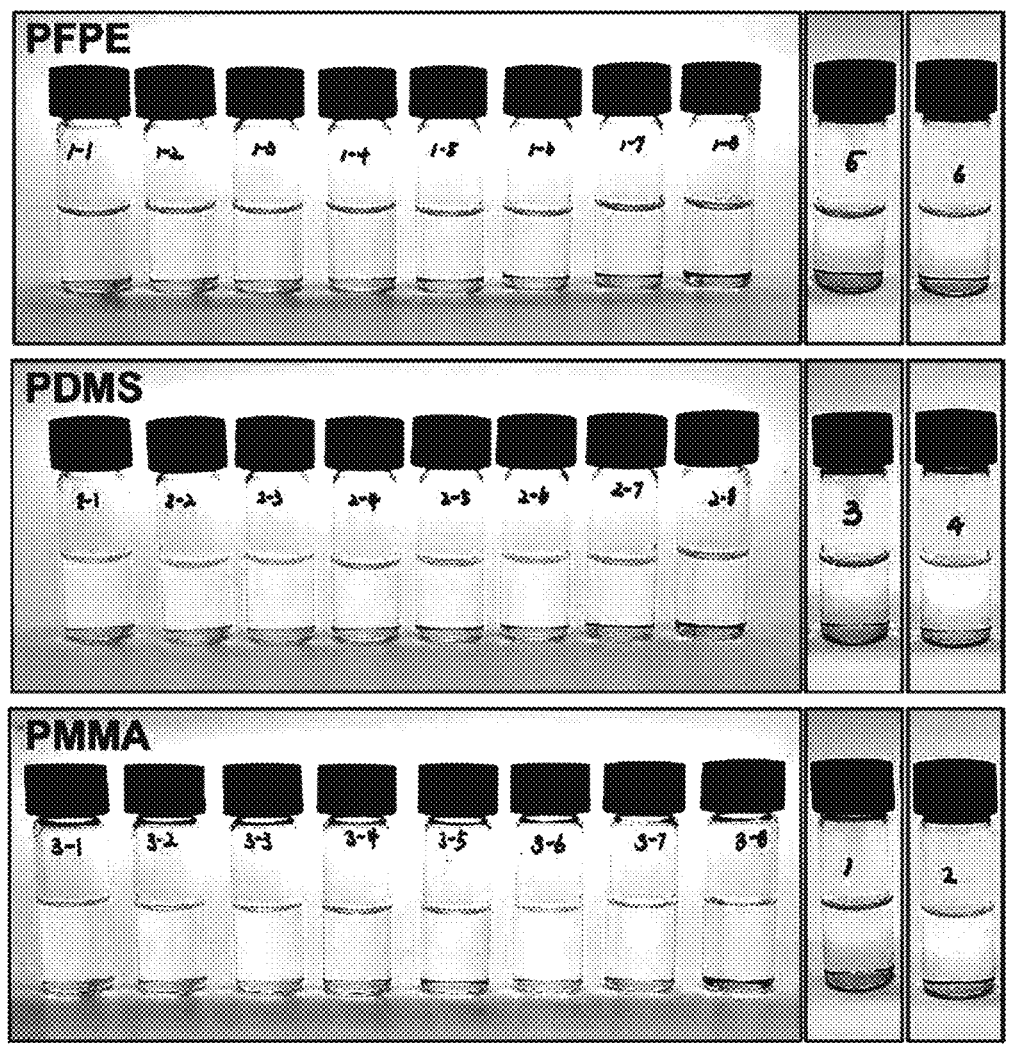
FIG. 4B shows photographs in which leaching degrees of coumarin 6 of various solvents to which the PFPE sample, P the MMA sample, and the PDMS sample doped with coumarin 6 were exposed are visually identified.

Referring to FIG. 4B, it can be confirmed that the plurality of organic solvents exposed to the fifth and sixth samples leached more amount of fluorescent dyes (i.e., C6) from the sample than the plurality of organic solvents exposed to the fourth sample, resulting in more discoloration. Referring to FIG. 3C, it can be confirmed that an intensity of an absorbance peak corresponding to C6 is stronger in the plurality of organic solvents exposed to the fifth and sixth samples than in the plurality of organic solvents exposed to the fourth sample. Therefore, it can be confirmed that the fourth sample leached significantly lower amount of the fluorescent dyes than the fifth and sixth samples.

Meanwhile, in the identifying of the coloration of the sample by the organic dye-based photocatalyst, the coloration of the seventh to ninth samples exposed to the plurality of solutions containing the organic solvent and the organic dye-based photocatalyst may be visually identified and spectra of the seventh to ninth samples exposed to the plurality of solutions containing the organic solvent and the organic dye-based photocatalyst may be identified using UV-Vis spectroscopy.

Figure 5A:
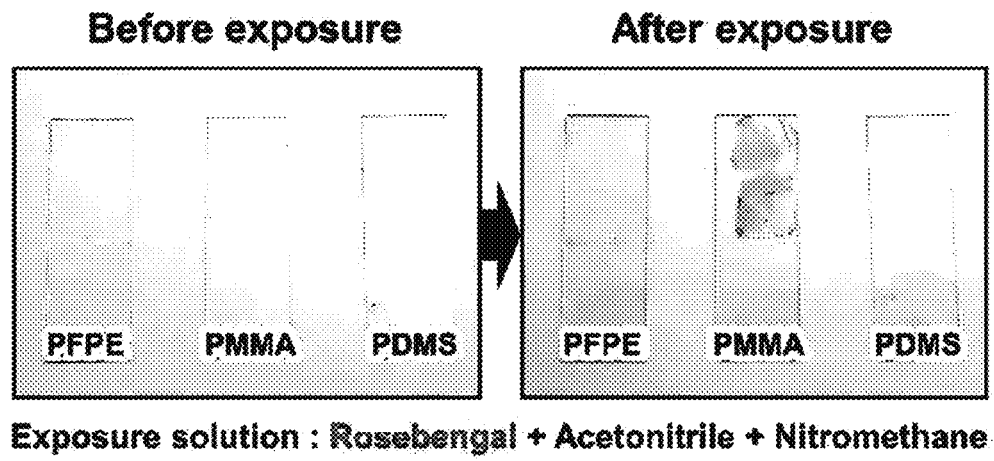
FIG. 5A shows photographs in which degrees of coloration of rose bengal on slide glasses coated with a PFPE resin, a PDMS resin, and a PMMA resin at a thin thickness are visually compared.
Figure 5B:
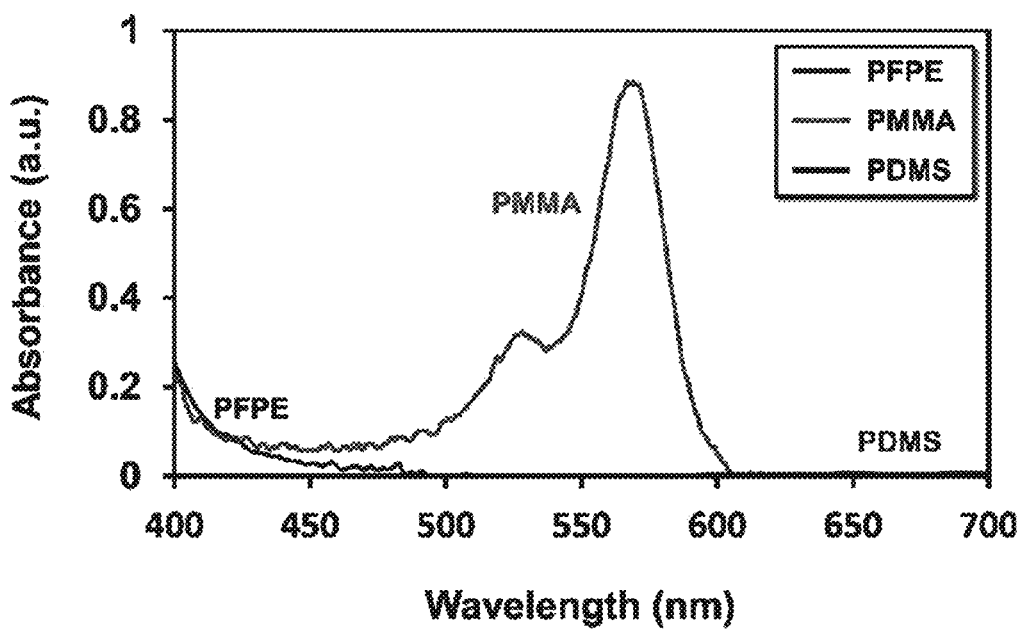
FIG. 5B shows UV-Vis spectra in which the degrees of coloration of rose bengal on a PFPE resin, a PDMS resin, and a PMMA resin are compared.
Figure 5C:
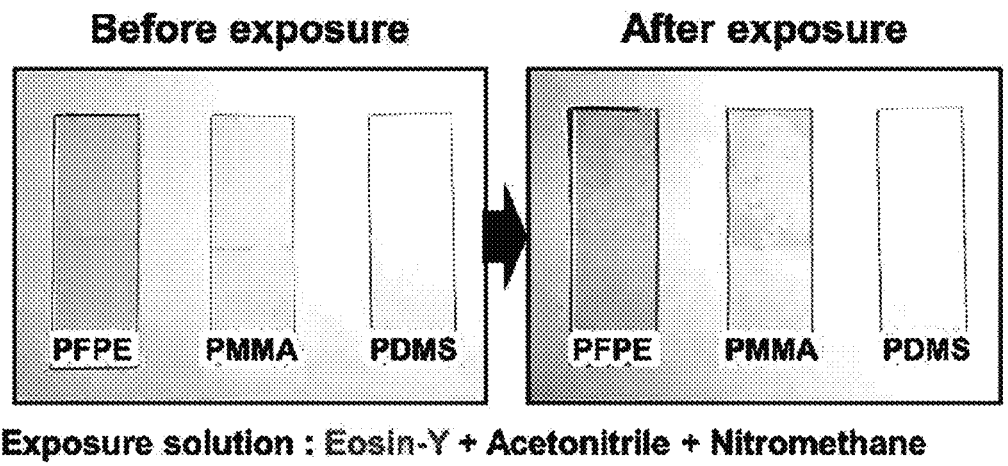
FIG. 5C shows photographs in which degrees of coloration of eosin-Y on slide glasses coated with a PFPE resin, a PDMS resin, and a PMMA resin at a thin thickness are visually compared.
Figure 5D:
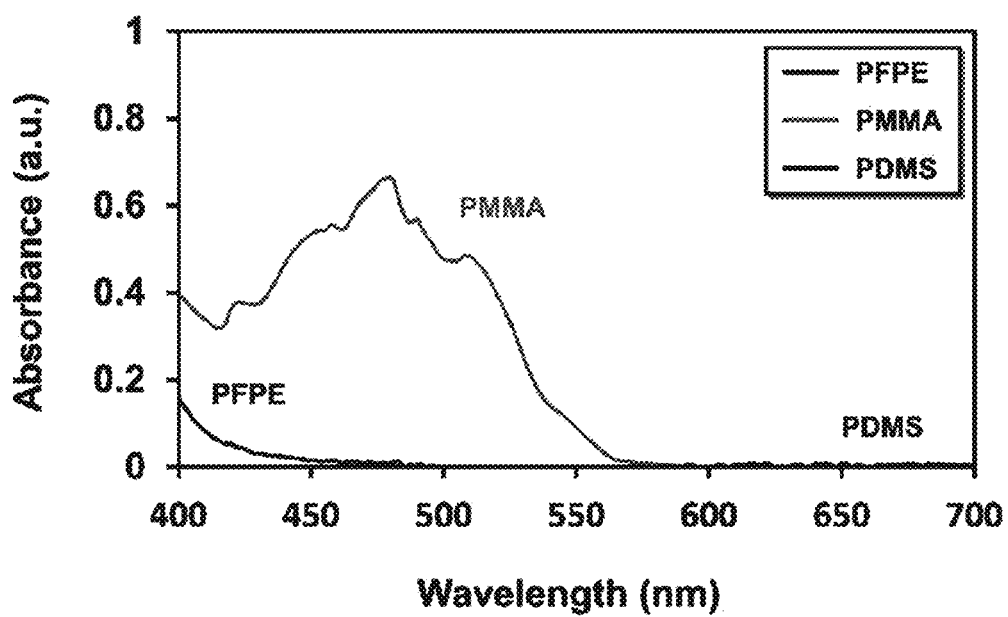
FIG. 5D shows UV-Vis spectra in which the degrees of coloration of eosin-Y on a PFPE resin, a PDMS resin, and a PMMA resin are compared.
Figure 6A:
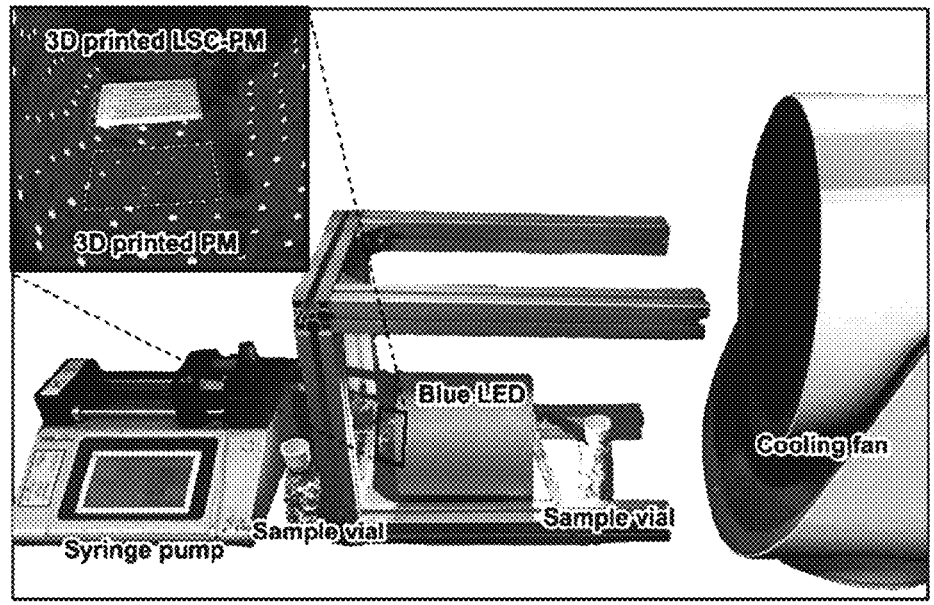
FIG. 6A is a photograph of equipment for testing photochemical reaction efficiency by a test subject under blue light.
Figure 6B:
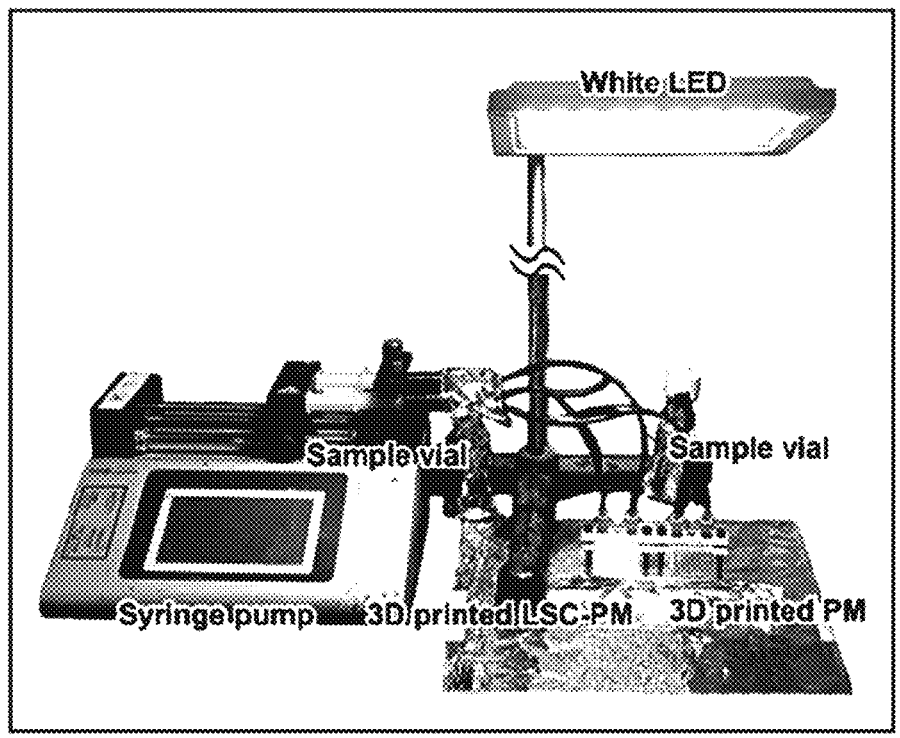
FIG. 6B is a photograph of equipment for testing photochemical reaction efficiency by a test subject under white light.

Referring to FIGS. 5A and 5B, it can be confirmed that the seventh and ninth samples are less colored in RB and EY than the eighth sample is. Further, it can be confirmed the eighth sample has higher absorbance than the seventh and ninth samples. Therefore, it can be confirmed that the eighth sample is more colored by the organic dye-based photocatalyst than the seventh and ninth samples.

Meanwhile, in the method of manufacturing the module structure for photomicro-reactors according to the embodiment of the present invention, after step (II) described above is performed, selecting any one of the plurality of resins on the basis of the identified chemical resistance is performed.

More specifically, based on the results identifying that, even when the first sample among the first to third samples is exposed to the organic solvent, the swelling occurred at the lowest possible level, the fourth sample among the fourth to sixth samples leached the least C6 as an organic solvent, and the eighth sample among the seventh to ninth samples was most colored by the organic dye-based photocatalyst, the first resin having the most excellent chemical resistance with respect to the organic solvent and the organic dye-based photocatalyst may be selected from the first to third resins.

Step (III)—Optimizing Design Parameters of Photomicro-Reactor on the Basis of Chemical Resistance Identified in Step (II)

In the method of manufacturing the module structure for photomicro-reactors according to the embodiment of the present invention, after step (II) is performed, the design parameters of the photomicro-reactor are optimized based on the chemical resistance identified in step (II) [step (III)].

In this case, in step (III), a step (III-1) of providing a plurality of test subjects with the design parameters changed based on the identified chemical resistance, a step (III-2) of identifying photochemical reaction efficiency of the plurality of test subjects, and a step (III-3) of optimizing the design parameters on the basis of the identified efficiency may be performed.

Meanwhile, the providing of the plurality of test subjects with the design parameters changed based on the identified chemical resistance means that preparing a plurality of test subjects with the changed design parameters using a resin whose chemical resistance is identified.

In this case, the resin whose chemical resistance is identified may be a photocurable resin, and the plurality of test subjects may be prepared by a 3D printing method using a photocurable resin. In the present embodiment, the resin whose chemical resistance is identified was a first resin, which is a photocurable resin, and the plurality of test subjects were prepared by the 3D printing method.

Figure 7:
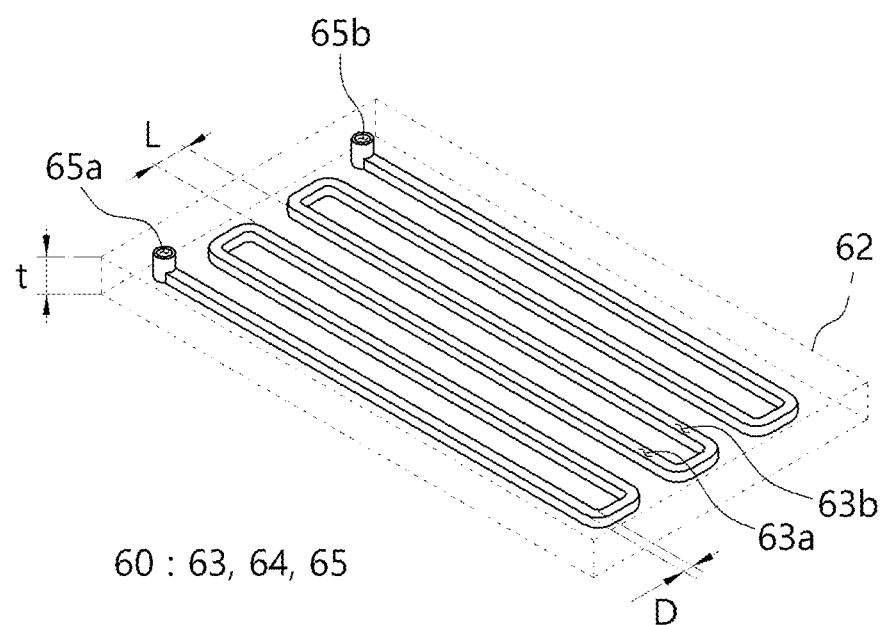
FIG. 7 is a perspective view of a test subject used in a step of optimizing design parameters in a method of manufacturing a module structure for photomicro-reactors according to an embodiment of the present invention, wherein, for the description of the invention, a light collecting plate is indicated by a dotted line and a configuration projected by the light collecting plate is indicated by a solid line.
Figure 8A:
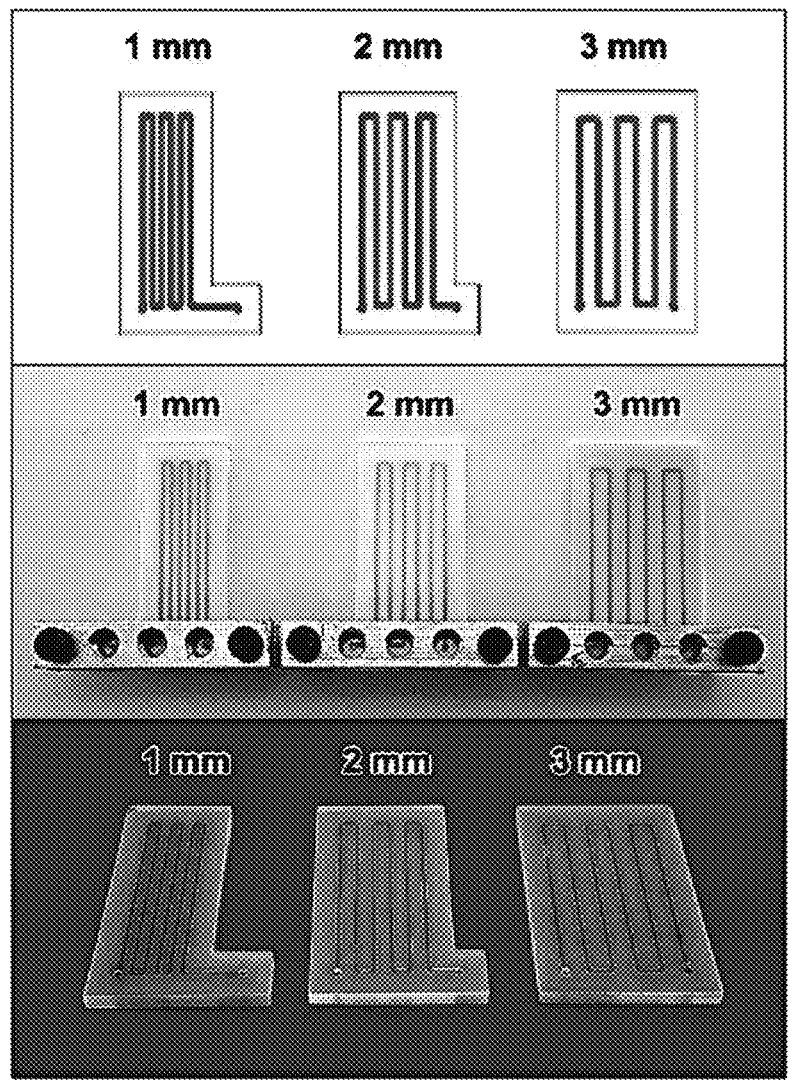
FIG. 8A shows views and photographs of test subjects in which an interval between a plurality of rows constituting a channel is changed.
Figure 8B:
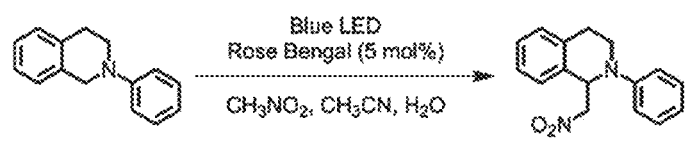
FIG. 8B is a reaction formula of a photochemical reaction that occurs inside a test subject.
Figures 8C, 8D:
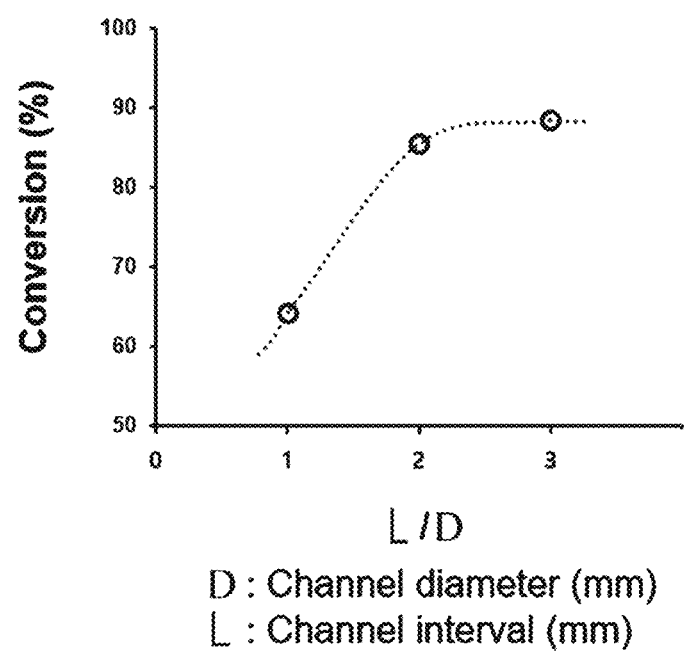
FIG. 8C is a table showing a relationship between an interval between channels and a conversion rate of a photochemical reaction.
FIG. 8D is a graph showing a relationship between a ratio of intervals between a plurality of rows to a diameter of a channel and the conversion rate of a photochemical reaction.
Figure 9D:
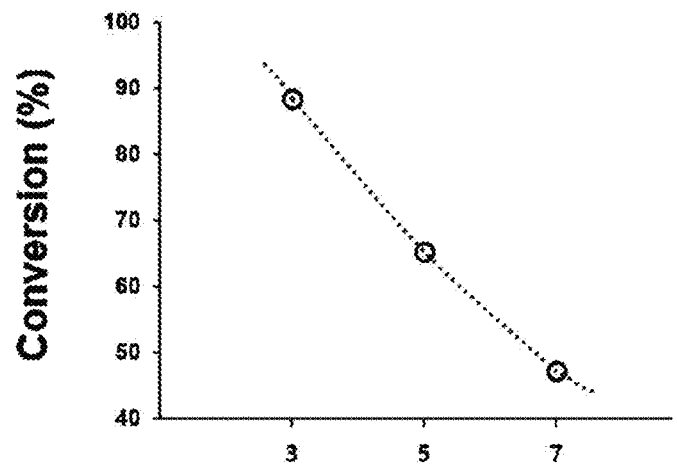
FIG. 9D is a graph showing a relationship between a ratio of a thickness of a light collecting plate to a diameter of a channel and the conversion rate of a photochemical reaction.
Figure 10A:
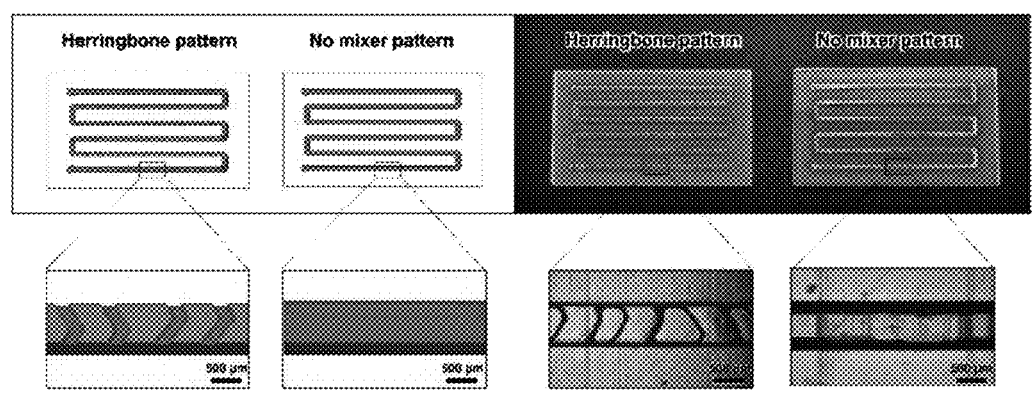
FIG. 10A shows plan views and photographs of a test subject provided with a static mixer and a test subject not provided with a static mixer.
Figures 10B, 10C:
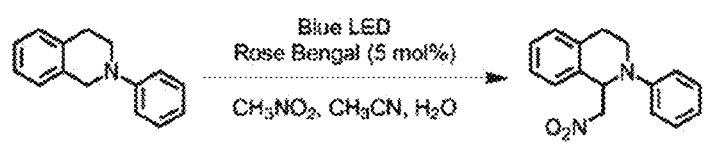
FIG. 10B is a reaction formula of a photochemical reaction that occurs inside a test subject.
FIG. 10C is a table showing a relationship between a static mixer and a conversion rate of a photochemical reaction.

FIG. 7 is a perspective view of a test subject used in a step of optimizing design parameters in a method of manufacturing a module structure for photomicro-reactors according to an embodiment of the present invention, wherein, for the description of the invention, a light collecting plate is indicated by a dotted line and a configuration projected by the light collecting plate is indicated by a solid line. FIG. 8A shows views and photographs of test subjects in which an interval between a plurality of rows constituting a channel is changed, FIG. 8B is a reaction formula of a photochemical reaction that occurs inside a test subject, FIG. 8C is a table showing a relationship between an interval between channels and a conversion rate of a photochemical reaction, and FIG. 8D is a graph showing a relationship between a ratio of intervals between a plurality of rows to a diameter of a channel and the conversion rate of a photochemical reaction. FIG. 9A shows views and photographs of test subjects in which a thickness of a light collecting plate is changed, FIG. 9B is a reaction formula of a photochemical reaction that occurs inside a test subject, FIG. 9C is a table showing a thickness of the light collecting plate and a conversion rate of a photochemical reaction, and FIG. 9D is a graph showing a relationship between a ratio of a thickness of a light collecting plate to a diameter of a channel and the conversion rate of a photochemical reaction. FIG. 10A shows plan views and photographs of a test subject provided with a static mixer and a test subject not provided with a static mixer, FIG. 10B is a reaction formula of a photochemical reaction that occurs inside a test subject, and FIG. 10C is a table showing a relationship between a static mixer and a conversion rate of a photochemical reaction.

Referring to FIG. 7, in the method of manufacturing the module structure for photomicro-reactors according to the embodiment of the present invention, a test subject 60 used in optimizing a design parameter may include a fourth light collecting plate 62, a fourth channel 63, a fourth inlet 65a, and a fourth outlet 65b.

The fourth light collecting plate 62 has a predetermined thickness t and is manufactured in a rectangular plate shape perpendicular to an incident light beam. In this case, the fourth light collecting plate 62 may be doped with a fluorescent dye. In the present embodiment, the doped fluorescent dye is C6 contained in a first resin.

The fourth inlet 65a, into which a fluid containing a reactant of a photochemical reaction, an organic solvent, and an organic dye-based photocatalyst is introduced, and the fourth outlet 65b, through which a fluid containing a product generated through the photochemical reaction, a reactant that has not undergone the photochemical reaction, an organic solvent, and an organic dye-based photocatalyst is discharged, are formed on an upper surface of the fourth light collecting plate 62.

The fourth channel 63, which has a predetermined diameter D, connects the fourth inlet 65a to the fourth outlet 65b, and is formed in a zigzag manner such that a plurality of rows 63a and 63b are arranged to form a single flow path as a whole, is formed in an inside of the fourth light collecting plate 62. A reactant and a photocatalyst flow and photochemically react inside the fourth channel 63.

Meanwhile, a cross section of the fourth channel 63 may have an appropriate shape in consideration of characteristics of the fluid flowing in the fourth channel 63, a flow speed of the fluid, friction between the fluid and a wall of the fourth channel 63, and characteristics of a manufacturing method, etc. In the present embodiment, the fourth channel 63 of the test subject 60 was manufactured to have a cross section of a square having a side length D of 1 mm.

Further, the design parameter is provided with a plurality of design parameters. Referring to FIG. 7, in the present embodiment, the plurality of design parameters include a ratio (i.e., L/D, and hereinafter, referred to a "first parameter") of an interval L between the plurality of rows 63a and 63b to the diameter D of the fourth channel 63, a ratio (i.e., t/D, and hereinafter, referred to a "second parameter") of the thickness t of the fourth light collecting plate 62 to the diameter D of the fourth channel 63, and the presence or absence of a static mixer (not illustrated).

In this case, the static mixer is a device for mixing or dispersing a fluid. The static mixer may be formed to protrude inward from an inner wall of the fourth channel 63 to have a predetermined height.

In the present embodiment, the static mixer may be formed to have a plurality of protrusions formed in a herringbone shape when viewed from the top. A vertex of any herringbone-shaped protrusion among the plurality of protrusions may be positioned to be biased toward one side of the fourth channel 63, and a vertex of another herringbone-shaped protrusion adjacent to the herringbone-shaped protrusion may be positioned adjacent to the other side opposite to one side of the fourth channel 63, and thus the vertex of any herringbone-shaped protrusion and the vertex of another herringbone-shaped protrusion may be formed to be misaligned with each other.

Further, a direction in which the vertex of the herringbone-shaped protrusion faces may be provided in parallel with a movement direction of the fluid flowing in the fourth channel 63. Accordingly, the fluid flowing in the fourth channel 63 flows irregularly due to the static mixer, and thus mixing and dispersion can be promoted.

Further, the plurality of test subjects provided in step (III-1) may include first, second, and third test subjects each prepared to have a first parameter having a value of 1, 2, or 3, fourth, fifth, and sixth test subjects each prepared to have a second parameter having a value of 3, 5, or 7, a seventh test subject with a static mixer, and an eighth test subject without a static mixer.

In this case, in addition to the changed design parameters, factors that may affect a conversion rate of the photochemical reaction are fixed to have constant values. For example, a type and concentration (the doped dye in FIG. 8) of the fluorescent dye, characteristics (the light source in FIG. 8) of the light source, an amount of time (the residence time in FIG. 8) the fluid stays inside the test subject, and the like are fixed to have constant values.

In step (III-2) of the method of manufacturing the module structure for photomicro-reactors according to the embodiment of the present invention, allowing a fluid containing a reactant of a photochemical reaction, an organic dye-based photocatalyst, and an organic solvent to flow through a channel of an inside of the test subject, radiating white light or blue light to the plurality of test subjects, and measuring and comparing a conversion rate of the reactant of the photochemical reaction occurring inside the test subject may be performed.

Referring to FIGS. 8C and 8D, it can be confirmed that, when a value of a first parameter increases from 1 to 2, the conversion rate of the photochemical reaction increases from 64.2% to 85.5%. It can be confirmed that, when the value of the first parameter increases from 2 to 3, the conversion rate of the photochemical reaction increases from 85.5% to 88.5%.

When the first parameter increases, the number of fluorescent dye molecules that absorb incident light between the plurality of rows and then transmit the light to a channel increases, and thus the conversion rate of the photochemical reaction increases. However, since a surface area of the channel capable of absorbing transmitted light is constant, when the first parameter exceeds a predetermined value, an increase in the conversion rate of the photochemical reaction is reduced even when a distance between the plurality of rows is increased. However, since an amount of materials input to the photomicro-reactor and manufacturing costs increase as the first parameter increases, a maximum value of the first parameter needs to be limited from an economic point of view.

Referring to FIGS. 9C and 9D, it can be confirmed that, when a value of a second parameter increases from 3 to 5, the conversion rate of the photochemical reaction decreases from 88.5% to 65.4%, and when the value of the second parameter increases from 5 to 7, the conversion rate of the photochemical reaction decreases from 65.4% to 47.3%.

When the second parameter increases, the number of fluorescent dye molecules transmitted to the channel after absorbing incident light increases, but an amount of incident light transmitted until the photochemical reaction is performed decreases. Among them, since the latter influence is dominant, it can be confirmed that, when the second parameter is increased, the conversion rate of the photochemical reaction is reduced. However, an upper side of the channel should be sealed so as not be exposed to the outside. Further, in the manufacturing process, there may be a limit to the size that can minimize the thickness t of the light collecting plate.

Referring to FIG. OC, it can be confirmed that a conversion rate of a photochemical reaction of the eighth test subject without a static mixer was 4.9% lower than that of the seventh test subject with a static mixer. Since a reactant and an organic dye-based photocatalyst may be uniformly mixed by the static mixer and a light beam having a uniform distribution may be incident on the reactant and the organic dye-based photocatalyst, the conversion rate of the photochemical reaction can be improved.

Meanwhile, the optimizing of the design parameters on the basis of the efficiency identified in step (III-3) means adopting the design parameters having the highest efficiency among the identified efficiencies. Further, design parameters predicted to have higher efficiencies may be adopted based on the identified trends in identified efficiencies. Furthermore, it means that the design parameters are adopted in consideration of the identified or predicted efficiency, the limitations of the manufacturing process, the costs invested in the manufacturing process, and the like.

In this case, when the plurality of design parameters are provided, steps (III-1) to (III-3) are performed on any one of the design parameters and then steps (III-1) to (III-3) are repeatedly performed on another design parameter, and thus a combination of a plurality of optimized design parameters may be adopted.

In the present embodiment, it is predicted that the efficiency increases as the first parameter increases. However, the value of the first parameter was optimized to 3 in consideration of a decrease in an increase in conversion rate of the photochemical reaction according to an increase in first parameter and an increase in manufacturing cost required.

Thereafter, the value of the first parameter was fixed to 3 and then steps (III-1) to (III-3) were performed on the second parameter. It is predicted that the efficiency increases as the second parameter decreases. However, the value of the second parameter was optimized to 3 in consideration of the limitations of the manufacturing process.

Thereafter, it was optimized that the static mixer is installed in consideration of the increase in manufacturing cost due to the static mixer and the improvement of the conversion rate of the photochemical reaction.

As described above, in the method of manufacturing the module structure for photomicro-reactors according to the embodiment of the present invention, by optimizing the design parameters of the photomicro-reactor on the basis of the identified chemical resistance of the photocurable resin, the conversion rate of the photochemical reaction can be improved.

Figure 11:
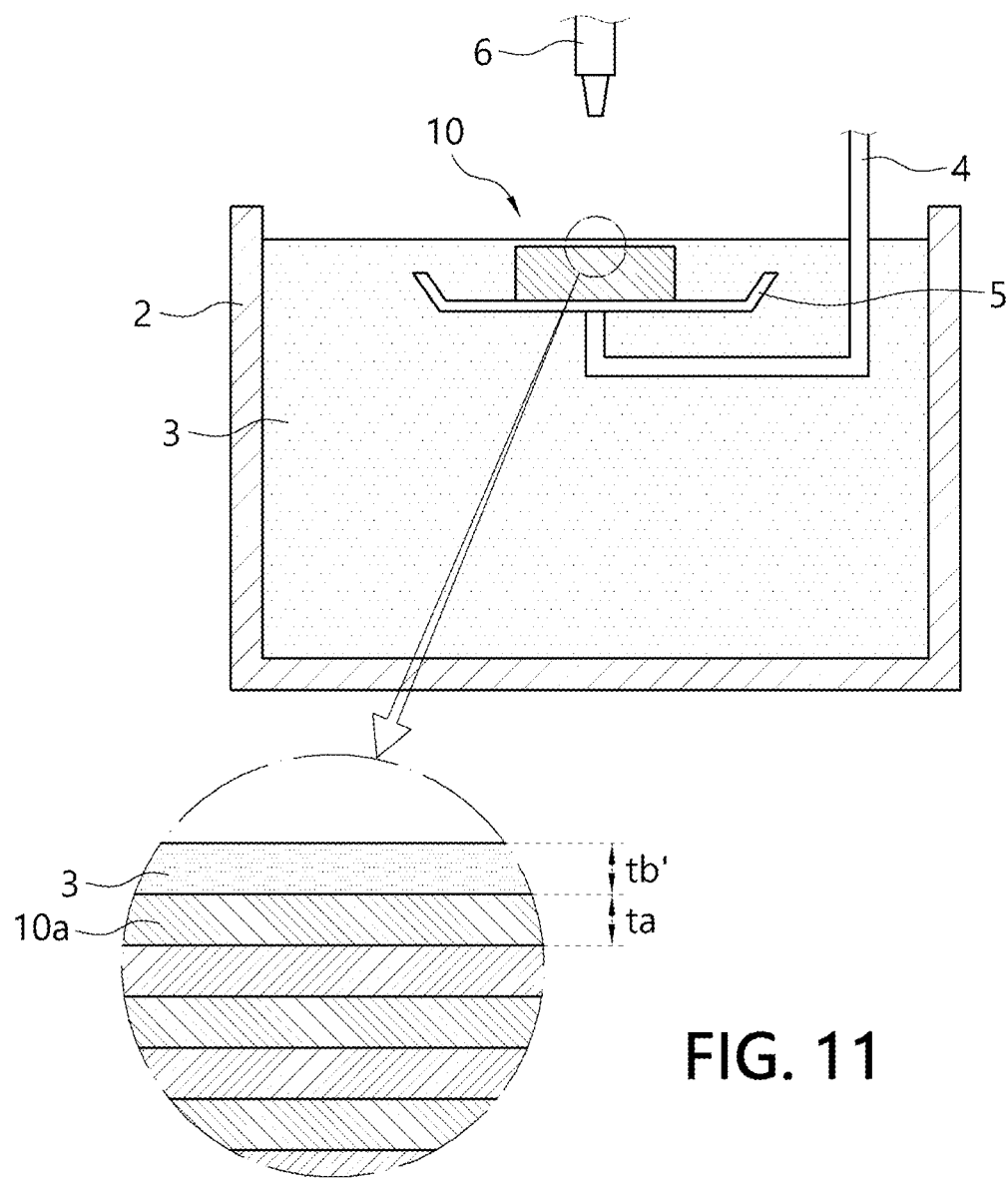
FIGS. 11 to 13 are views illustrating a process of manufacturing a module structure for photomicro-reactors according to an embodiment of the present invention in a 3D printing method.
Figure 12:
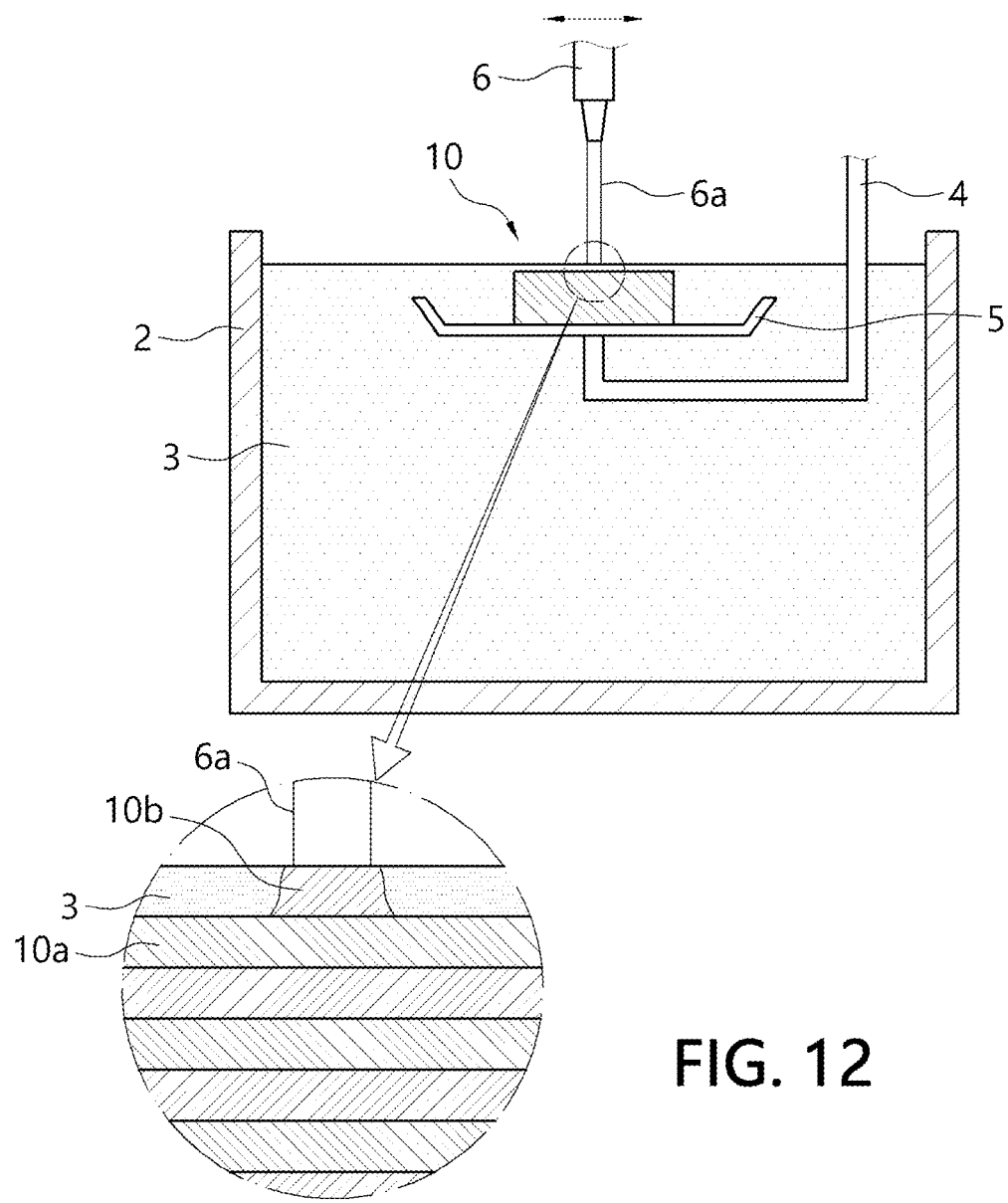
Figure 13:
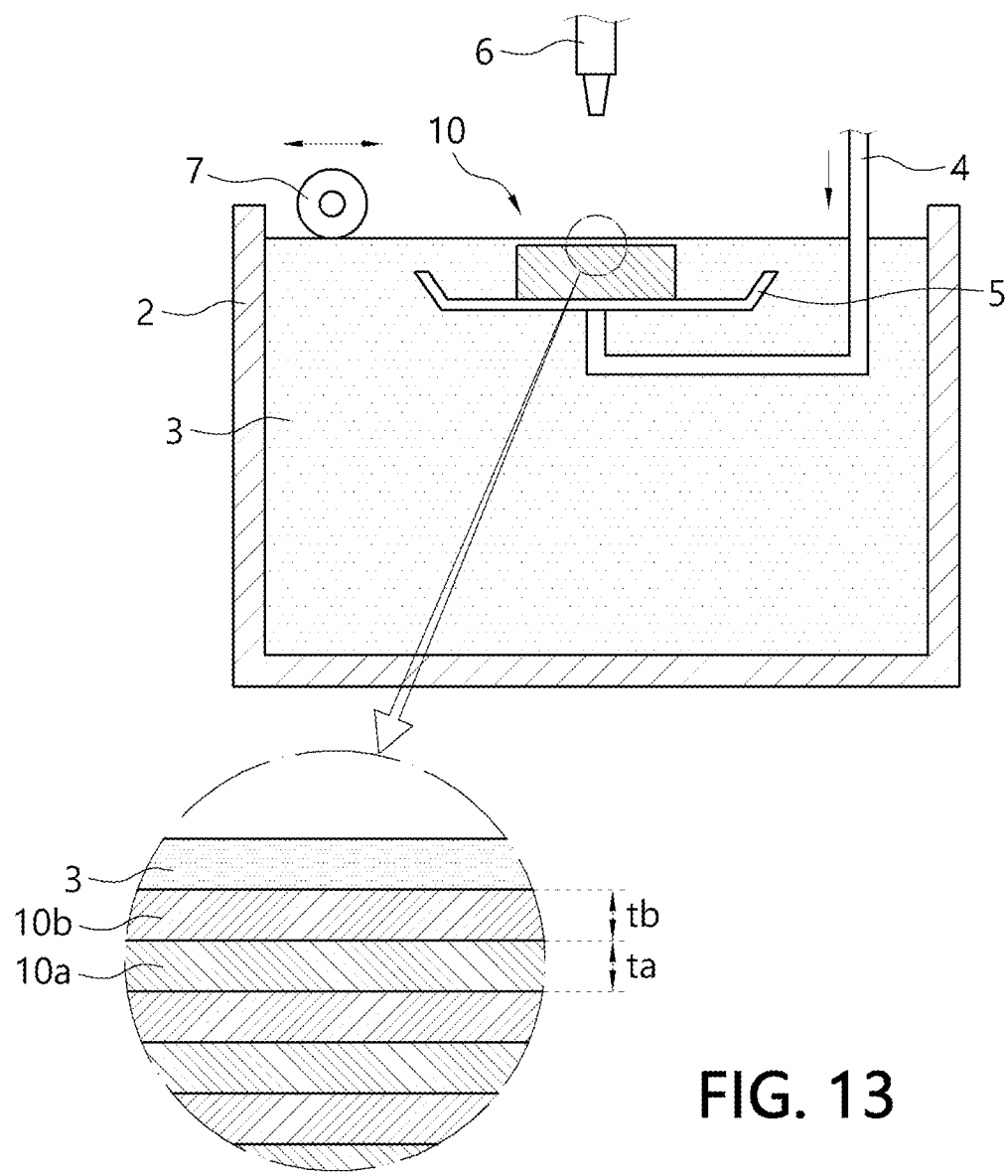

FIGS. 11 to 13 are views illustrating a process of manufacturing a module structure for photomicro-reactors according to an embodiment of the present invention in a 3D printing method.

Step (IV)—Preparing Photomicro-Reactor Using Resins on the Basis of Design Parameters Optimized in Step (III)

In the method of manufacturing the photomicro-reactor for photomicro-reactors according to the embodiment of the present invention, after step (III) is performed, a photomicro-reactor is prepared using resins on the basis of the design parameters optimized in step (III) [step (IV)].

In this case, in step (IV), manufacturing a module structure for photomicro-reactors may be performed by a 3D printing process using the first resin which is the prepared photocurable resin.

More specifically, referring to FIG. 11, in order to perform the 3D printing process, a predetermined container 2 is filled with a photocurable resin 3. A support plate 5 on which a module structure 10 for photomicro-reactors is disposed on an upper surface thereof is provided in an inner side of the photocurable resin 3.

One side of the support plate 5 may be coupled to a vertical movement device 4, and the support plate 5 may be moved upward or downward by the operation of the vertical movement device 4. An UV light generating device 6 capable of radiating UV light inducing a photocuring reaction is provided above the container 2.

In this case, by adjusting a position of the support plate 5 by the vertical movement device 4, the photocurable resin 3 is disposed on an upper side of the module structure 10 for photomicro-reactors to have a predetermined thickness tb'. The thickness tb' of the photocurable resin 3 may be adjusted to correspond to a thickness of a unit layer to be described below.

Referring to FIG. 12, the UV light generating device 6 exposes one region of a surface of the photocurable resin 3 to UV light 6a to form a unit layer 10b having a predetermined thickness. In this case, the UV light generating device 6 moves from an upper side of the container 2 and exposes the one region to UV light 6a, and thus the unit layer 10b having a predetermined shape is formed on an upper surface of the pre-formed module structure 10 for photomicro-reactors.

In this case, as described above, an exposure time of the UV light 6a may be controlled to be in a range of 3 seconds to 9 seconds, preferably, about 6 seconds. An intensity of the UV light 6a may be set to in a range of 15 mW/cm$^2$ to 25 mW/cm$^2$, preferably, about 20 mW/cm$^2$. A thickness of the unit layer may range from 20 μm to 100 μm, preferably, about 50 μm.

Referring to FIG. 13, when the unit layer 10b having the predetermined shape is printed on the upper surface of the module structure 10 for photomicro-reactors, the operation of the UV light generating device 6 is stopped. Thereafter, the vertical movement device 4 is operated to move the support plate 5 downward so that an upper portion of the module structure 10 for photomicro-reactors is submerged in the photocurable resin 3.

Accordingly, the photocurable resin 3 used for forming a new unit layer is disposed on the upper side of the module structure 10 for photomicro-reactors. In this case, a process in which a sweeper 7 planarizes the surface of the photocurable resin 3 may also be performed.

By repeatedly performing the above-described processes, a plurality of unit layers 10a and 10b are formed and stacked, and thus the module structure 10 for photomicro-reactors is manufactured.

In this way, in the method of manufacturing the photomicro-reactor for photomicro-reactors according to the embodiment of the present invention, the photomicro-reactor may be manufactured using the 3D printing method that is suitable for manufacturing complex small devices and does not require high skill in the manufacturing process, and thus a time and costs invested in the manufacturing process of the photomicro-reactor can be reduced.

Meanwhile, in FIGS. 11 to 13, in order to help with understanding of the present invention, additional configurations and processes incidentally required are omitted, and well-known configurations and processes for the manufacture of the manufactured module structure for photomicro-reactors may be additionally provided.

Further, in FIGS. 11 to 13, although a stereolithography (SLA) printer among 3D printers using a photocurable resin is illustrated, various well-known 3D printers such as a digital light processing (DLP) printer and the like may be used in an embodiment of the present invention.

A method of manufacturing a photomicro-reactor according to an embodiment of the present invention may include manufacturing a plurality of module structures for photomicro-reactors by using the method of manufacturing the module structure for photomicro-reactors described above, and coupling at least some of the plurality of manufactured module structures for photomicro-reactors in a line or radial shape.

According to the method of manufacturing the photomicro-reactor according to the embodiment of the present invention, a photomicro-reactor including a straight assembly in which a plurality of module structures for photomicro-reactors are coupled in a line or a radial assembly in which a plurality of module structures for photomicro-reactors are radially coupled may be manufactured.

Accordingly, throughput and conversion rate of a photochemical reaction performed in a photomicro-reactor can be improved. Specific details thereof will be described below together with the straight assembly and the radial assembly.

Hereinafter, a photomicro-reactor according to an embodiment of the present invention will be described in more detail.

The photomicro-reactor according to the embodiment of the present invention may include at least one of the straight assembly and the radial assembly. Before describing the straight assembly and the radial assembly, first to third module structures for photomicro-reactors constituting the straight assembly and the radial assembly will be described first.

Figure 14:
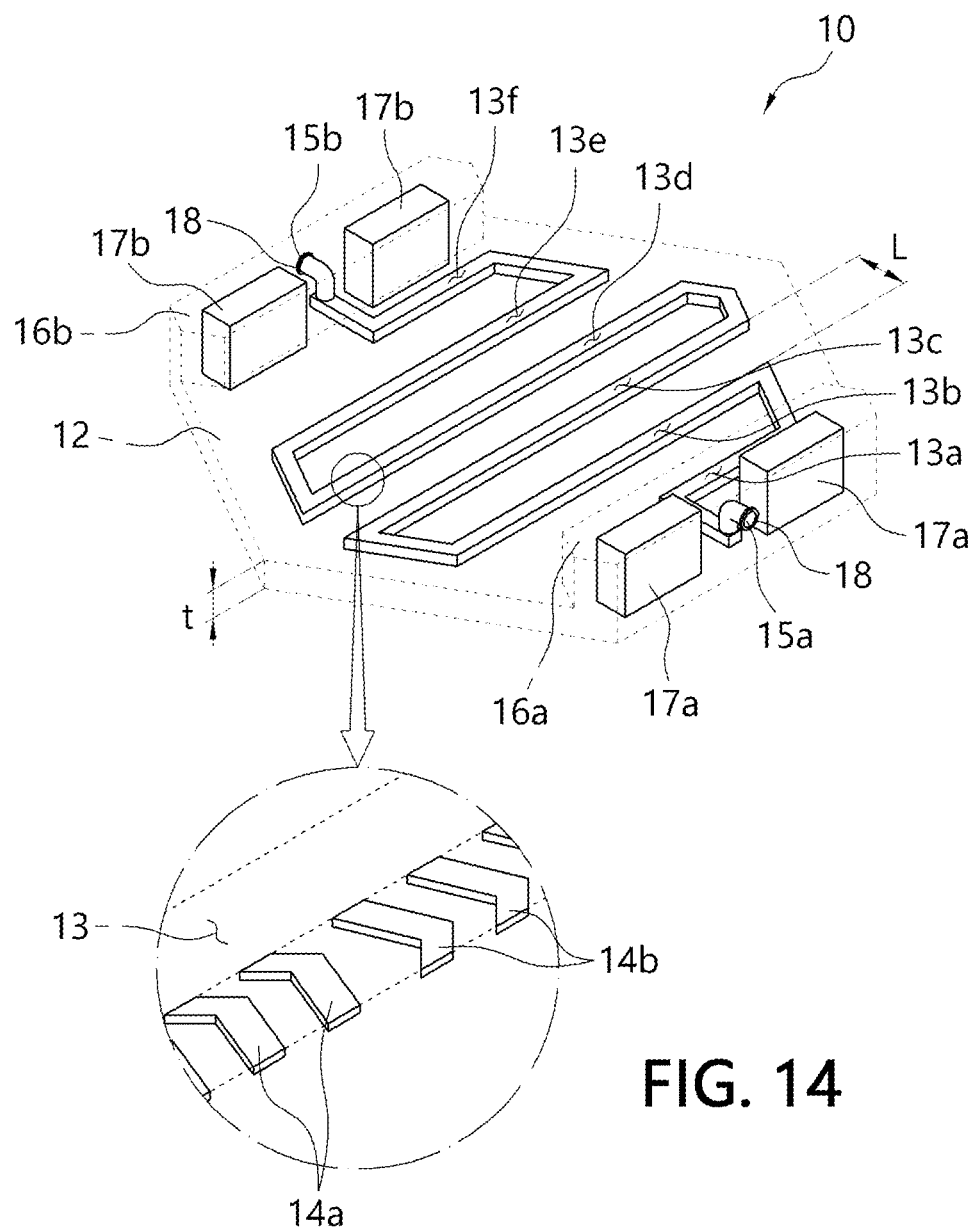
FIG. 14 is a perspective view of a first module structure for photomicro-reactors according to an embodiment of the present invention, wherein, for the description of the invention, a first light collecting plate is indicated by a dotted line and a configuration projected by the first light collecting plate is indicated by a solid line.

FIG. 14 is a perspective view of a first module structure for photomicro-reactors according to an embodiment of the present invention, wherein, for the description of the invention, a first light collecting plate is indicated by a dotted line and a configuration projected by the first light collecting plate is indicated by a solid line.

Referring to FIG. 14, a first module structure 10 for photomicro-reactors according to the embodiment of the present invention may include a first light collecting plate 12, a first inlet 15a, a first outlet 15b, and a first channel 13.

The first light collecting plate 12 has a predetermined thickness to collect incident sunlight, and is formed as a polygonal plate shaped member doped with a fluorescent dye. In this case, the polygonal shape may include a regular hexagon.

Each of the plurality of equilateral triangles, squares, or regular hexagons may be disposed so that there is no empty space on a plane. In this case, since the regular hexagon is closer to a circle than a triangle and a quadrangle, when a plurality of regular hexagons are arranged so that there is no empty space on a plane has higher structural stability than when triangles or quadrangles are arranged.

Therefore, when a plurality of first module structures 10 for photomicro-reactors are arranged adjacent to each other so that the side surfaces of the first light collecting plates 12 are in contact with each other, high space utilization and structural stability can be achieved.

Meanwhile, the shape of the first light collecting plate 12 described above is only a non-limiting example, and the first light collecting plate 12 may be formed in an appropriate shape according to a shape of a space in which the module structure 10 for photomicro-reactors is disposed, a direction and angle of incident sunlight, or a shape of the first channel 13 formed therein. For example, the first light collecting plate 12 may be formed as a rectangular plate-shaped member.

Meanwhile, in order for a plurality of cubes having the same size to fill a planar surface so that there is no empty space, one side of one cube and one side of another cube should be in contact with each other, and the centers of sides in contact with each other should be in contact with each other.

The first inlet 15a is formed in the center of one side surface of the regular hexagon of the first light collecting plate 12, and the first outlet 15b is formed in the center of the other side surface opposite to the one side surface of the first light collecting plate 12.

Therefore, when the plurality of first module structures 10 for photomicro-reactors are arranged on a predetermined plane so that there is no empty space, the first inlet 15a of the first module structures 10 for photomicro-reactors may be connected to the first outlet 15b of the first module structure 10 for photomicro-reactors adjacent thereto.

Accordingly, the plurality of first module structures 10 for photomicro-reactors may have high structural stability and space utilization, and the first inlet 15a and a second outlet may be connected to form one long channel.

The first channel 13 connecting the first outlet 15b and the first inlet 15a is formed in an inside of the first light collecting plate 12.

A solution containing a reactant, a photocatalyst, and an organic solvent of a photochemical reaction is introduced into the first light collecting plate 12 through the first inlet 15*a*, flows in the first channel 13 formed inside the first light collecting plate 12, and then is discharged to the outside of the first light collecting plate 12 through the second outlet.

The fluorescent dye with which the inside of the first light collecting plate 12 is doped adsorbs light (or sunlight) collected by the first light collecting plate 12, then converts the light into light having a spectrum that can be absorbed by the photocatalyst, and is discharged to the first channel 13. The reactant and the photocatalyst of the photochemical reaction flowing in the first channel 13 absorb light directly incident on the first channel 13 and light emitted from the fluorescent dye and photochemically react.

In this case, as a length of the first channel 13 increases, the probability that the reactant and the photocatalyst absorb sufficient light energy for the photochemical reaction to occur increases.

Therefore, in order to form a channel having a large length by maximally utilizing the limited internal space of the first light collecting plate 12, the first channel 13 is formed on in a zigzag manner such that a plurality of rows 13*a*, 13*b*, 13*c*, 13*d*, 13*e*, and 13*f* are arranged between the first outlet 15*b* and the first inlet 15*a* to form one flow path.

Meanwhile, first coupling portions 16*a* and 17*a* are formed on one side of the first light collecting plate 12, and second coupling portions 16*b* and 17*b* that can be coupled to a first coupling portion of the neighboring first module structure for photomicro-reactors are formed on the other side.

The first coupling portions 16*a* and 17*a* include a first body 16*a* formed on one side portion of the first light collecting plate 12 and having a first inlet 15*a* positioned at an outer surface thereof. A first magnet member 17*a* is provided in the first body 16*a* so as to be adjacent to the first inlet 15*a*. The first body 16*a* protrudes upward to provide a space in which the first magnet member 17*a* can be accommodated therein.

The first magnet member 17*a* is provided as a pair of first magnet members 17*a* on both side portions of the first body 16*a*. In this case, the first inlet 15*a* is positioned between the pair of first magnet members 17*a*. To this end, the first inlet 15*a* is positioned at a slightly higher position than the first channel 13 inside the first light collecting plate 12, and an end portion of the first channel 13 is formed as a curved pipe connected to the first inlet 15*a*.

The second coupling portions 16*b* and 17*b* are formed in a similar manner to the first coupling portions 16*a* and 17*a* described above. That is, the second coupling portions 16*b* and 17*b* include a second body 16*b* formed on the other side portion of the first light collecting plate 12 and having a first outlet 15*b* positioned at the outer surface, and a pair of second magnet members 17*b* adjacent to the first outlet 15*b* are symmetrically provided on the second body 16*b*.

Accordingly, when the first coupling portions 16*a* and 17*a* are coupled to second coupling portions of other first module structures for photomicro-reactors adjacent to each other, the first magnet member 17*a* and the second magnet member strongly couple both side portions of the first inlet 15*a* and the first outlet, and thus strong airtightness between the first inlet 15*a* and the first outlet may be ensured.

Further, since a magnetic force generated by the first magnet member 17*a* and the second magnet member allows other module structures for photomicro-reactors adjacent to the first module structure 10 for photomicro-reactors to be self-arranged, the module structures for photomicro-reactors are easily coupled.

Further, in order to prevent a leakage of a fluid from the first inlet 15*a* and the second outlet 15*b*, a sealing member 18 is provided at at least one of the first inlet 15*a* and the first outlet 15*b*. In this case, the sealing member 18 may be formed as an O-ring.

Meanwhile, a static mixer 14 is formed in the first channel 13. The static mixer 14 generates irregular flow (or turbulence) of a fluid including a reactant, a photocatalyst, and an organic solvent flowing in the first channel 13.

Accordingly, the static mixer 14 may promote mixing and diffusion so that the reactant, the photocatalyst, and the organic solvent of the photochemical reaction are evenly distributed and the reactant and the photocatalyst of the photochemical reaction may be uniformly exposed to light.

Referring to FIG. 14, the static mixer 14 is formed on a lower surface of an inner wall of the first channel 13. Of course, the static mixer 14 may be formed on an upper surface or a side surface of the first channel 13 or may be formed on a plurality of surfaces.

In the present embodiment, in order to reduce the influence that may have on the light incident on the upper side of the first channel 13, the static mixer 14 is formed on the lower surface of the inner wall of the first channel 13.

The static mixer 14 is formed with a plurality of protrusions protruding into the first channel 13 to have a predetermined height. In this case, the plurality of protrusions are made to have a herringbone shape.

A vertex of any one herringbone-shaped protrusion 14*a* of the plurality of protrusions may be formed to be biased toward one side of the first channel 13, and a vertex of another herringbone-shaped protrusion 14*b* adjacent thereto is formed to be biased in an opposite direction. Accordingly, the static mixer 14 of the herringbone-shaped protrusions 14*a* and 14*b* may generate flow of a fluid flowing in a zigzag direction to promote diffusion and dispersion of reactant and photocatalyst.

Further, the static mixer 14 of the herringbone-shaped protrusions 14*a* and 14*b* may continuously circulate the reactant and photocatalyst flowing in the first channel 13 and exposes the reactant and photocatalyst to the surface, thereby reducing the light gradient inside the first channel 13.

Meanwhile, the plurality of rows 13*a*, 13*b*, 13*c*, 13*d*, 13*e*, and 13*f* constituting the first channel 13 may include a first row 13*b* and a second row 13*c* adjacent to the first row 13*b*, and a diameter D of the first channel 13 and a distance L between the first row 13*b* and the second row 13*c* may satisfy the following relational expression. $1 \leq L/D \leq 6$ (D: the diameter of the first channel 13, L: distance between the first row and the second row)

Referring to FIGS. 8C and 8D again, it can be confirmed that, when a value of L/D increases from 1 to 2, the conversion rate of the photochemical reaction increases from 64.2% to 85.5%, and when the value of L/D increases from 2 to 3, the conversion rate of the photochemical reaction increases from 85.5% to 88.5%. Therefore, when the value of L/D is 1 or more, a high conversion rate of the photochemical reaction may be achieved. Therefore, a lower limit value of L/D may preferably have a value of 1 or more.

It can be seen that, even when the value of L/D increases to 2 or more, an increase in the conversion rate of the photochemical reaction is smaller than that in the case in which the value of L/D is 2 or less. In particular, referring to FIG. 8D, it can be expected that, when L/D has a value of 3 or more, the conversion rate of the photochemical reaction converges to a specific limit value. Therefore, the lower limit value of L/D may preferably have a value of 2 or more.

Meanwhile, the upper limit value of L/D may be set to 6 in consideration of the characteristics of the module structure for photomicro-reactors, the manufacturing cost, the manufacturing process, and the like. Accordingly, the value of L/D may be determined to be in a range of 1 to 6.

Referring to FIGS. 9C and 9D again, it can be confirmed that, when the value of t/D increases from 3 to 5, the conversion rate of the photochemical reaction decreases from 88.5% to 65.4%, and when the value of t/D increases from 5 to 7, the conversion rate of the photochemical reaction decreases from 65.4% to 47.3%.

That is, as the value of t/D decreases, the higher conversion rate of the photochemical reaction may be achieved. However, since the diameter D of the first channel 13 cannot have a value smaller than the thickness t of the first light collecting plate 12, t/D should have a value greater than 1.

Therefore, the diameter D of the first channel 13 and the thickness t of the first light collecting plate 12 may satisfy the following relational expression. $1<t/D\leq5$ (t: the thickness of the first light collecting plate 12, D: the diameter of the first channel 13). More preferably, the value of t/D may have a value within a range of $1<t/D\leq3$.

Meanwhile, the first module structure 10 for photomicro-reactors according to the embodiment of the present invention is manufactured by the method of manufacturing the module structure for photomicro-reactors described above.

That is, the first light collecting plate 12 is made of a photocurable resin containing PFPE serving as a polymer. As described above, the photocurable resin containing PFPE has excellent chemical resistance with respect to an organic solvent and an organic dye-based photocatalyst.

Accordingly, the module structure for photomicro-reactors according to the embodiment of the present invention may maintain a chemically stable state even when the organic dye-based photocatalyst or the organic solvent is included in a fluid flowing into the first light collecting plate 12, and thus the module structure may be used compatibly with various organic photocatalysts or organic solvents.

Further, as described above, the photocurable resin containing PFPE may be used for 3D printing. Accordingly, the module structure for photomicro-reactors according to the present embodiment may be manufactured by a 3D printing process that is suitable for manufacturing complex small devices and does not require high skill in the manufacturing process. Therefore, a time and costs invested in the manufacturing process of the photomicro-reactor can be reduced.

Furthermore, according to the present embodiment, since modularization and miniaturization of the module structure for photomicro-reactors may be achieved, by configuring the photomicro-reactor with the plurality of miniaturized module structures for photomicro-reactors and controlling their arrangement, it is possible to achieve improvement in the conversion rate and throughput of the photochemical reaction.

Figure 15A:
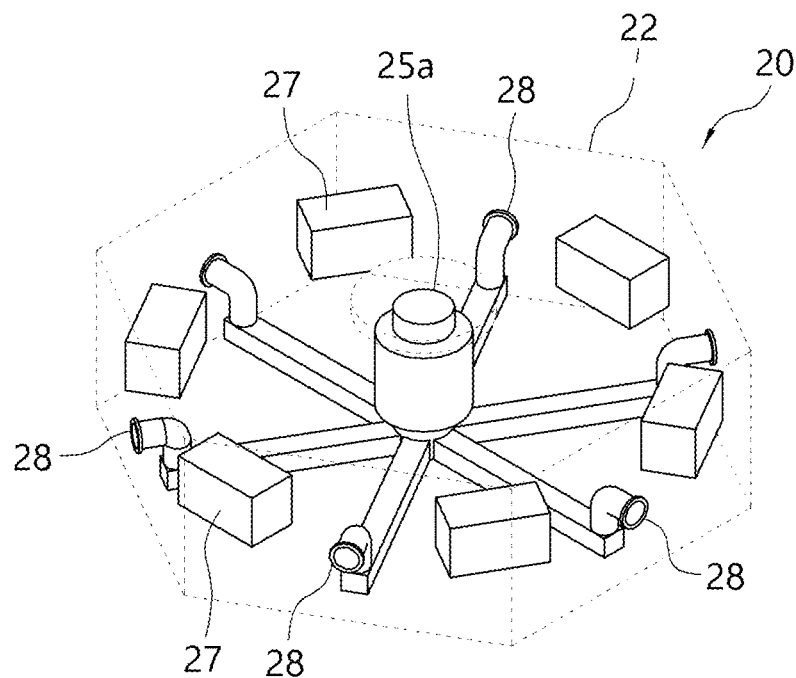
FIG. 15A is a perspective view of a second module structure for photomicro-reactors according to an embodiment of the present invention.
Figure 15B:
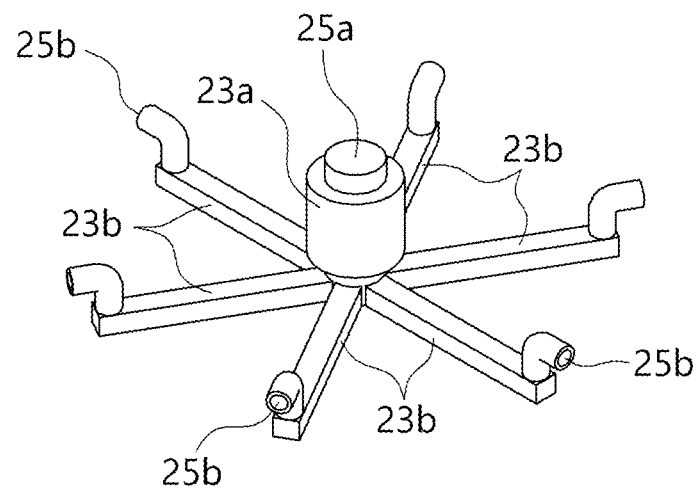
FIG. 15B is a perspective view of a second channel formed inside a second light collecting plate, wherein, for the description of the invention, in FIG. 15A, the second light collecting plate is indicated by a dotted line and a configuration projected by the second light collecting plate is indicated by a solid line.

FIG. 15A is a perspective view of a second module structure for photomicro-reactors according to an embodiment of the present invention, and FIG. 15B is a perspective view of a second channel formed inside a second light collecting plate, wherein, for the description of the invention, in FIG. 15A, the second light collecting plate is indicated by a dotted line and a configuration projected by the second light collecting plate is indicated by a solid line.

Referring to FIG. 15A, the second module structure for photomicro-reactors according to the embodiment of the present invention includes a second light collecting plate 22, a second channel 23, a second inlet 25a, and a plurality of second outlets 25b.

The second light collecting plate 22 is formed as a polygonal member doped with a fluorescent dye and having a predetermined thickness. In this case, the polygonal shape of the second light collecting plate 22 includes a regular hexagon having the same size as the regular hexagon of the first light collecting plate (illustrated in FIG. 14).

The second inlet 25a through which a reactant and a photocatalyst are introduced is formed on an upper surface of the second light collecting plate 22. The plurality of second outlets 25b through which the reactant and the photocatalyst introduced into the second light collecting plate 22 are discharged are formed on side surfaces of the second light collecting plate 22.

In this case, each of the plurality of second outlets 25b is formed at the center of each of the side surfaces of the second light collecting plate 22. That is, six second outlets 25b are formed. Accordingly, a plurality of first module structures for photomicro-reactors (illustrated in FIG. 14) are radially arranged around a second module structure 20 for photomicro-reactors, and thus the first inlet 15a may be connected to each of the plurality of second outlets 25b. Further, the second module structure 20 for photomicro-reactors and the plurality of first module structures 10 for photomicro-reactors may be disposed on a predetermined plane without empty space.

Accordingly, the photomicro-reactor to which the plurality of module structures 10 and 20 for photomicro-reactors are coupled may have high space utilization on a plane. Further, the second channel 23 of the second module structure 20 for photomicro-reactors and the first channel 13 of the first module structure 10 for photomicro-reactors may be connected to each other to form one long channel.

Meanwhile, a third magnet member 26 which is provided between the plurality of second outlets 25b and can be coupled to the first magnet member of the first module structure for photomicro-reactors by a magnetic force is provided on a side portion of the second module structure 20 for photomicro-reactors. Furthermore, a sealing member 28 is provided at the second inlet 25a and each of the plurality of second outlets 25b.

Meanwhile, the second module structure 20 for photomicro-reactors according to the embodiment of the present invention is manufactured by the method of manufacturing the module structure for photomicro-reactors described above. That is, the second light collecting plate 22 is prepared by a 3D printing process using a photocurable resin containing PFPE.

The second channel 23 is formed inside the second light collecting plate 22, and is formed inside the second light collecting plate 22 to connect the second inlet 25a and the plurality of second outlets 25b.

In this case, referring to FIG. 15B, the second channel 23 includes a vertical portion 23a that is connected to the second inlet 25a and extends downward in the second light collecting plate 22, and branch portions 23b that branched off from the vertical portion 23a toward the plurality of second outlets 25b.

Accordingly, the second module structure 20 for photomicro-reactors may distribute the fluid introduced into one second inlet 25a to the plurality of second outlets 25b and discharge the fluid, and thus efficiency of the space where the photomicro-reactor is installed can be increased and throughput can be increased.

Numerical studies were conducted to evaluate performance of the second module structure 20 for photomicro-reactors according to the shape of the second channel 23 described above. Computational fluid dynamics (CFD) simulations were performed via FLUENT 6.1 software (ANSYS, INC.).

Based on a finite volume method, equations were discretized and linear velocity and pressure conditions were established for an inlet and an outlet without slip boundary conditions on walls of a channel. Calculations were performed based on the Navier-stokes equation. The uniformity of a flow distribution across the branch portions 23b is determined by a maldistribution factor (MF). The definition of MF is as follows.

$$MF\ (\%) = \sqrt{\frac{1}{n-1}\sum_{i=1}^{n}\left(\frac{m_i - \overline{m}}{\overline{m}}\right)^2} \times 100$$

Here, n denotes the number of first module structures for photomicro-reactors, mi denotes an amount of mass flow of an $i^{th}$ first module structure for photomicro-reactors, and si denotes an average amount of mass flow of the photomicro-reactor. MF denotes a value obtained by dividing a standard deviation of the amount of mass flow by the average amount of mass flow. Therefore, a low MF value indicates that a flow distribution between the photomicro-reactors is uniform.

Figure 16A:
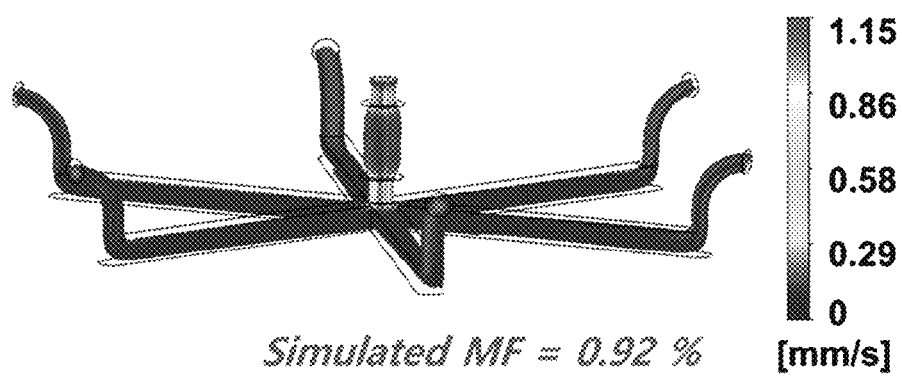
Figure 16B:
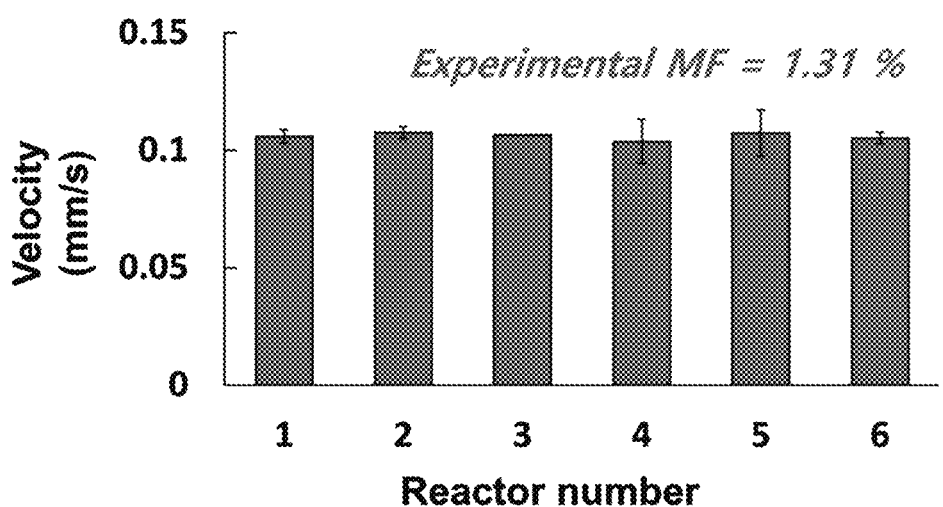

FIGS. 16A and 16B show numerical analysis and experimental results for distribution of an amount of flow of a second module structure for photomicro-reactors according to an embodiment of the present invention, wherein FIG. 16A shows a contour of a velocity field with an amount of flow of 30 μl/min obtained by numerical analysis, and FIG. 16B is a graph showing experimental results.

Under flow conditions (the total amount of flow=30 μl/minutes), the maldistribution factor (MF) was calculated to be approximately 0.92% by numerical analysis and 1.31% by experiment, which is sufficiently acceptable for chemical synthesis.

Figure 17:
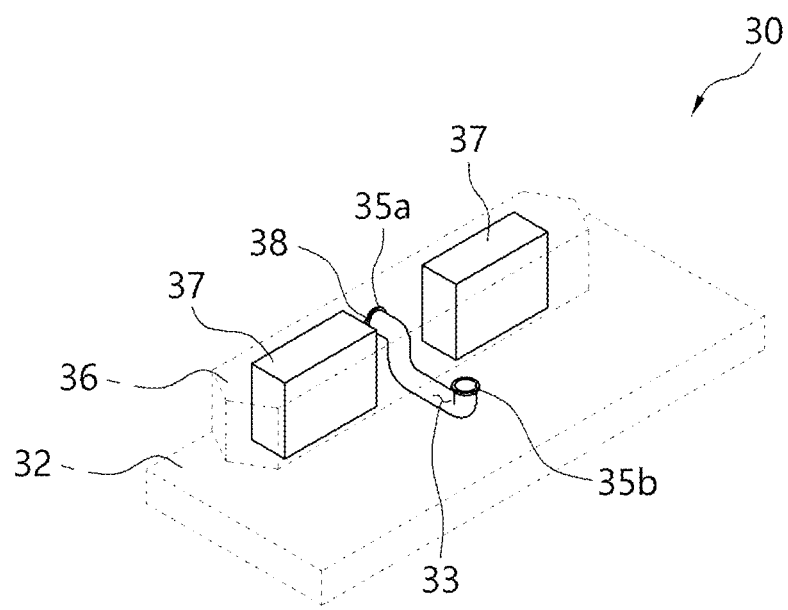
FIG. 17 is perspective view of a third module structure for photomicro-reactors according to an embodiment of the present invention, wherein, for the description of the invention, a third light collecting plate is indicated by a dotted line and a configuration projected by the third light collecting plate is indicated by a solid line.

FIG. 17 is perspective view of a third module structure for photomicro-reactors according to an embodiment of the present invention, wherein, for the description of the invention, a third light collecting plate is indicated by a dotted line and a configuration projected by the third light collecting plate is indicated by a solid line.

Referring to FIG. 17, the third module structure for photomicro-reactors according to the embodiment of the present invention includes a third light collecting plate 32, a third channel 33, a third outlet 35a, and a third inlet 35b.

The third light collecting plate 32 is formed as a rectangular plate-shaped member doped with a fluorescent dye and having a predetermined thickness. The third outlet 35a is formed on one side surface of the third light collecting plate 32, and the third inlet 35b is formed on an upper surface of the third light collecting plate 32.

The third channel 33 may be formed inside the third light collecting plate 32 to connect the third outlet 35a and the third inlet 35b. In this case, the sealing member 38 may be provided at the third outlet 35a and the third inlet 35b.

Meanwhile, third coupling portions 36 and 37 that can be coupled to the first or second coupling portion of the first module structure for photomicro-reactors described above are formed on one side of the third light collecting plate 32.

The third coupling portions 36 and 37 include a third body 36 that is formed on one side portion of the third light collecting plate 32 and having the third outlet 35a positioned at an outer surface thereof. A fourth magnet member 37 is provided in the third body 36 to be adjacent to the third outlet 35a. The third body 36 protrudes upward to provide a space in which the fourth magnet member 37 can be accommodated therein.

A pair of fourth magnet members 37 are provided on both side portions of the third body 36. In this case, the third outlet 35a is positioned between the pair of fourth magnet members 37.

Accordingly, when the third coupling portions 36 and 37 are coupled to the first or second coupling portions of other neighboring first module structures for photomicro-reactors, the fourth magnet member 37 and the first or second magnet member strongly couple both side portions of the third outlet 35a and the first inlet or the first outlet, and thus airtightness between the third outlet 35a and the first inlet or the first outlet may be secured.

Further, since a magnetic force generated by the fourth magnet member 37 and the first or second magnet member allows the third module structure 30 for photomicro-reactors and the neighboring module structure for photomicro-reactors to be self-arranged, the module structures for photomicro-reactors may be easily coupled.

Meanwhile, the third inlet 35b of the third module structure 30 for photomicro-reactors may be connected to a pump for supplying a fluid containing a reactant and a photocatalyst of a photochemical reaction or to a storage unit for storing a fluid containing a reactant, a photocatalyst, and a product of a photochemical reaction. Accordingly, the third module structure 30 for photomicro-reactors may serve to allow the fluid to continuously flow along an inside of the photomicro-reactor.

Meanwhile, the third module structure 30 for photomicro-reactor according to the embodiment of the present invention is manufactured by the method of manufacturing the module structure for photomicro-reactors described above. That is, the third light collecting plate 32 may be manufactured by a 3D printing method using a photocurable resin containing PFPE.

Figure 18:
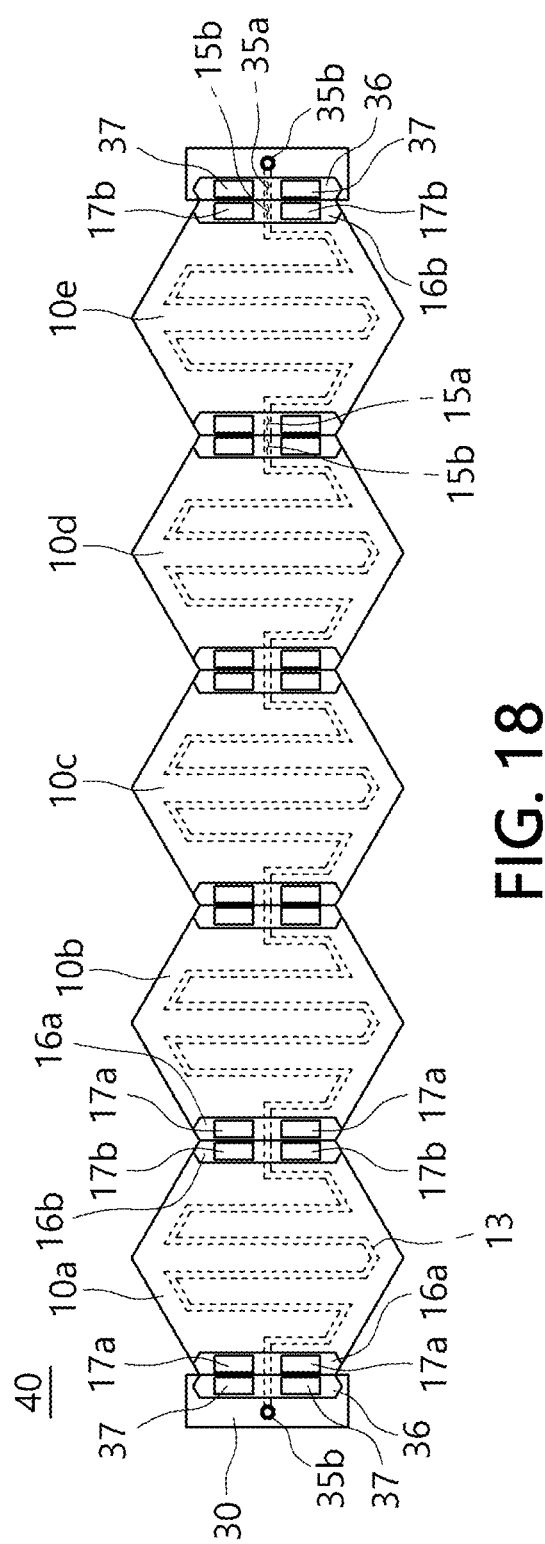
FIG. 18 is a plan view of a straight assembly of photomicro-reactors according to an embodiment of the present invention, wherein, for the description of the invention, a channel formed inside a light collecting plate is indicated by a dotted line and an O-ring is not illustrated.
Figure 19A:
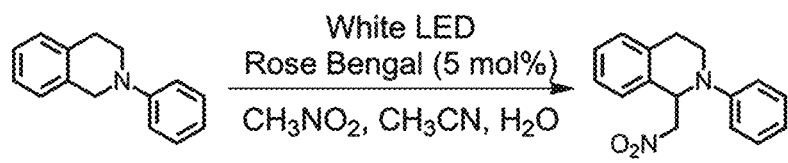
FIG. 19A is a reaction formula of a photochemical reaction that occurs inside a straight assembly of photomicro-reactors according to an embodiment of the present invention.
Figure 19B:
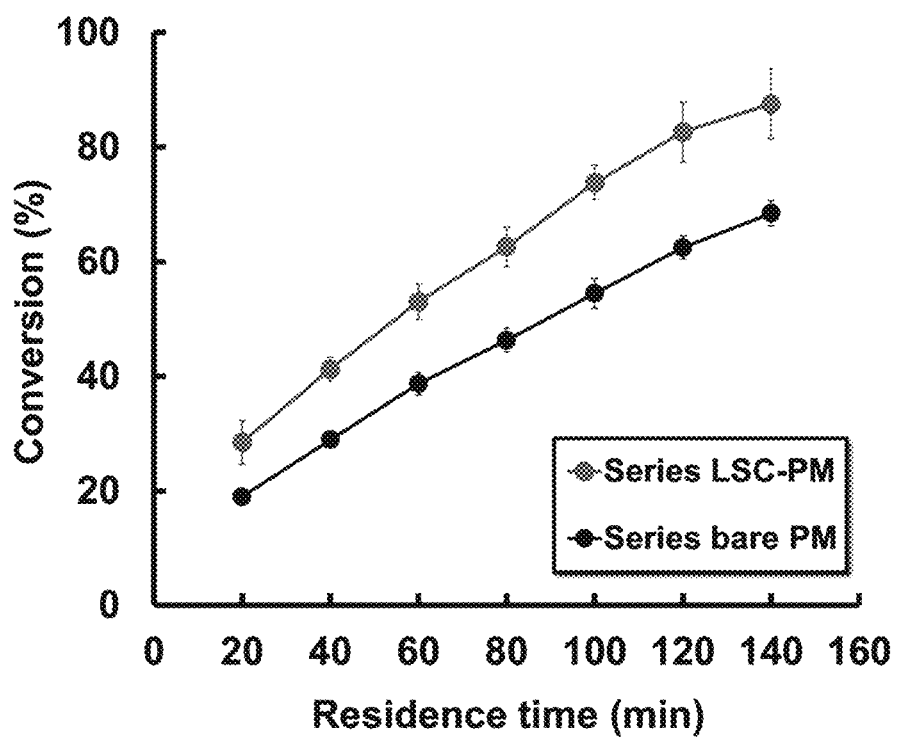
FIG. 19B is a graph for comparing a conversion rate of a photochemical reaction according to the number of module structures for photomicro-reactors of a straight assembly doped with a fluorescent dye and a conversion rate of a photochemical reaction according to the number of module structures for photomicro-reactors of a straight assembly not doped with a fluorescent dye.
Figure 20:
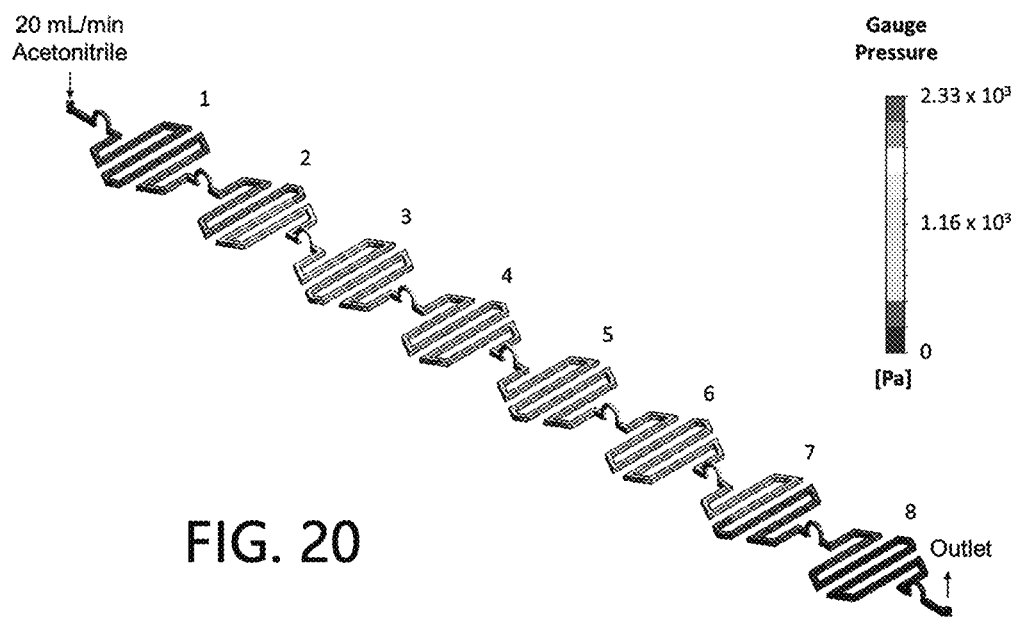
FIG. 20 is a result showing a pressure drop of a fluid flowing through a channel of an inside of a straight assembly in which eight first module structures for photomicro-reactors according to an embodiment of the present invention are coupled using a computational fluid dynamics simulation.

FIG. 18 is a plan view of a straight assembly of photomicro-reactors according to an embodiment of the present invention, wherein, for the description of the invention, a channel formed inside a light collecting plate is indicated by a dotted line and an O-ring is not illustrated. FIG. 19A is a reaction formula of a photochemical reaction that occurs inside a straight assembly of photomicro-reactors according to an embodiment of the present invention, and FIG. 19B is a graph for comparing a conversion rate of a photochemical reaction according to the number of module structures for photomicro-reactors of a straight assembly doped with a fluorescent dye and a conversion rate of a photochemical reaction according to the number of module structures for photomicro-reactors of a straight assembly not doped with a fluorescent dye. FIG. 20 is a result showing a pressure drop of a fluid flowing through a channel of an inside of a straight assembly in which eight first module structures for photomicro-reactors according to an embodiment of the present invention are coupled using a computational fluid dynamics simulation.

Referring to FIG. 18, the photomicro-reactor according to the embodiment of the present invention may include a straight assembly 40. In this case, the straight assembly 40 includes a plurality of first module structures 10 for photomicro-reactors arranged in a line and a third module structure 30 for photomicro-reactors coupled to both ends thereof.

A third outlet 35a of a third module structure 30 for photomicro-reactors is connected to a first inlet 15a and a first outlet 15b of first module structures 10a and 10e for photomicro-reactors positioned at both ends of a plurality of first module structures 10 for photomicro-reactors arranged in a line.

In this case, the first inlet 15a and the third outlet 35a are coupled to each other by a magnetic force generated between a first magnet member 17a and a fourth magnet member 37. Accordingly, the plurality of module structures 10 and 30 for photomicro-reactors may be arranged by themselves.

A plurality of first module structures 10b, 10c, and 10d for photomicro-reactors disposed between first module structures 10a and 10e for photomicro-reactors positioned at both ends are coupled to each other by the magnetic force generated between the first magnet member 17a and the second magnet member 17b.

Since sealing members 18 and 38 are provided at the first inlet 15a, the first outlet 15b and the third outlet 35a, it is possible to prevent a leakage of a fluid that may occur between the third module structure 30 for photomicro-reactors and the plurality of first module structures 10 for photomicro-reactors.

Accordingly, the straight assembly 40 may form one long channel 13 or 33 in which the first channel 13 and the third channel 33 are connected. Lengths of the channels 13 and 33 increase, a time that the reactant and the photocatalyst flowing in the channels 13 and 33 are exposed to incident light increases and the possibility of absorbing light energy for the photochemical reaction increases, and thus the higher conversion rate of the photochemical reaction may be achieved.

Referring to FIG. 19B, it can be confirmed that, as the number of the first module structures for photomicro-reactors constituting the straight assembly increases, a time (residence time) and conversion rate of the reactant and photocatalyst of the photochemical reaction staying inside the channel increase.

Referring to FIG. 20, in a straight assembly in which eight first module structures for photomicro-reactors are coupled in a line, it can be confirmed that, when a fluid having an amount of flow of 20 mL/min and a pressure of 2.33 kPa flows into the first inlet of the outermost first module structure for photomicro-reactors, the fluid flows through the channel under a stable pressure resistance. These results indicate that the photomicro-reactor including the straight assembly may be stably applied to a system for a photochemical reaction.

Figure 21:
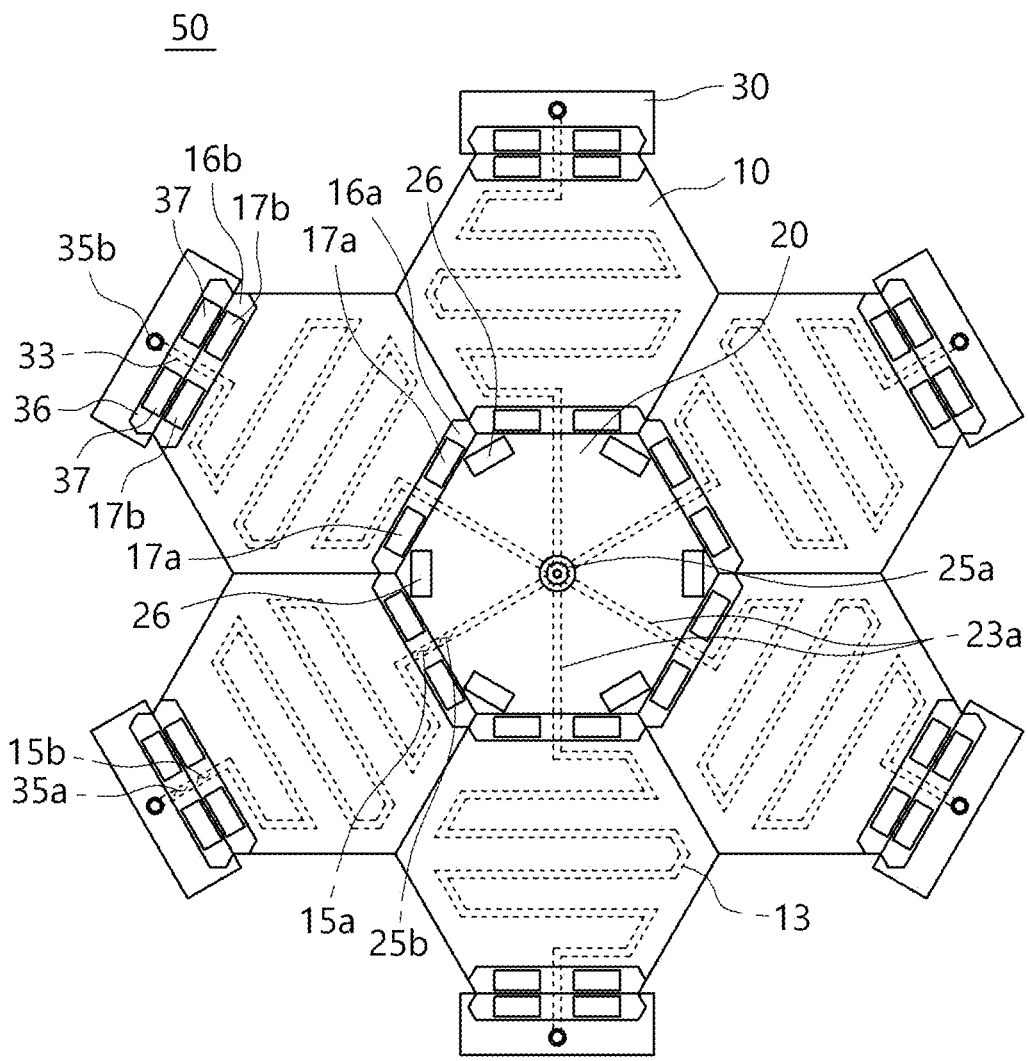
FIG. 21 is a plan view of a radial assembly of photomicro-reactors according to an embodiment of the present invention, wherein, for the description of the invention, a channel formed inside a light collecting plate is indicated by a dotted line and an O-ring is not illustrated.
Figure 22A:
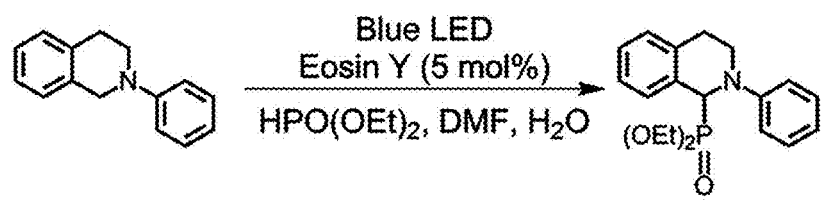
FIG. 22A is a reaction formula of a photochemical reaction that occurs inside a radial assembly of photomicro-reactors according to an embodiment of the present invention.
Figure 22B:
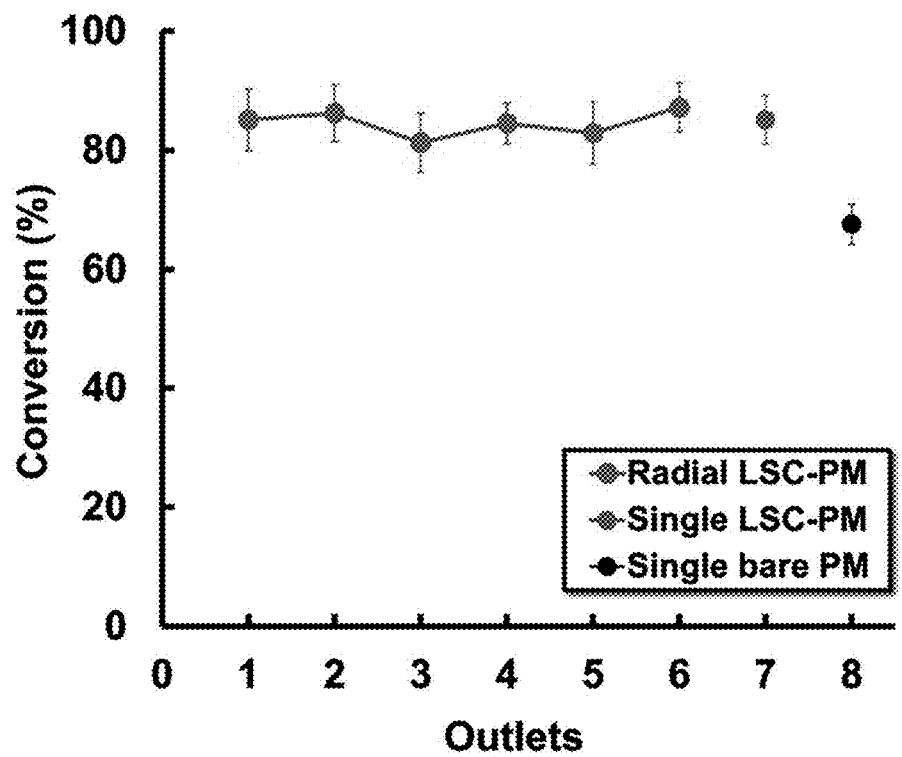
FIG. 22B is a graph for comparing a conversion rate of a radial assembly doped with a fluorescent dye, a conversion rate of a first module structure for photomicro-reactors doped with a fluorescent dye, and a conversion rate of a first module structure for photomicro-reactors not doped with a fluorescent dye.
Figure 23:
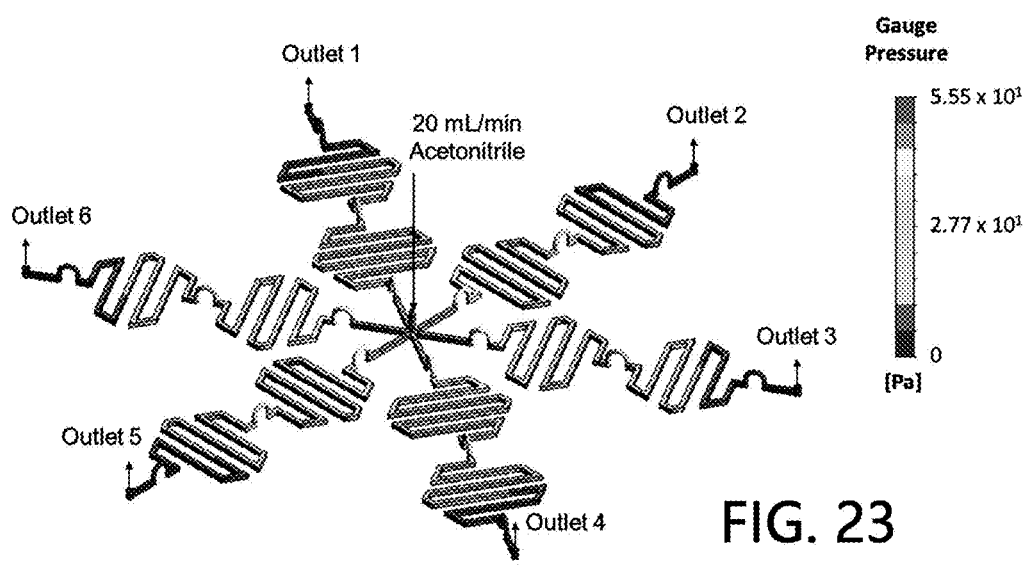
FIG. 23 is a result showing a pressure drop of a fluid flowing through a channel of an inside of a radial assembly in which twelve first module structures for photomicro-reactors according to an embodiment of the present invention are radially coupled to a second module structure for photomicro-reactors using a computational fluid dynamics simulation.

FIG. 21 is a plan view of a radial assembly of photomicro-reactors according to an embodiment of the present invention, wherein, for the description of the invention, a channel formed inside a light collecting plate is indicated by a dotted line and an O-ring is not illustrated. FIG. 22A is a reaction formula of a photochemical reaction that occurs inside a radial assembly of photomicro-reactors according to an embodiment of the present invention, and FIG. 22B is a graph for comparing a conversion rate of a radial assembly doped with a fluorescent dye, a conversion rate of a first module structure for photomicro-reactors doped with a fluorescent dye, and a conversion rate of a first module structure for photomicro-reactors not doped with a fluorescent dye. FIG. 23 is a result showing a pressure drop of a fluid flowing through a channel of an inside of a radial assembly in which twelve first module structures for photomicro-reactors according to an embodiment of the present invention are radially coupled to a second module structure for photomicro-reactors using a computational fluid dynamics simulation.

Referring to FIG. 21, the photomicro-reactor according to the embodiment of the present invention may include a radial assembly 50. In this case, the radial assembly 50 includes a plurality of first module structures 10 for photomicro-reactors, a second module structure 20 for photomicro-reactors, and a plurality of third module structures 30 for photomicro-reactors.

The plurality of first module structures 10 for photomicro-reactors are disposed in a radial direction with respect to the second module structure 20 for photomicro-reactors. In this case, first inlets 15a of the plurality of first module structures 10 for photomicro-reactors are respectively connected to a plurality of second outlets 25b of the second module structure 20 for photomicro-reactors.

The first module structures 10 for photomicro-reactors and the second module structure 20 for photomicro-reactors are coupled by first magnet members 17a and third magnet members 26, and a specific bonding process is as described above.

The plurality of third module structures 30 for photomicro-reactors are disposed in a radial direction with respect to the plurality of first module structures 10 for photomicro-reactors. In this case, third outlets 35a of the plurality of third module structure 30 for photomicro-reactors are respectively connected to the first outlets 15b of the first module structure 10 for photomicro-reactors.

The first module structures 10 for photomicro-reactors and the third module structure 30 for photomicro-reactors are coupled by the second magnet members 17b and the fourth magnet members 37, and a specific bonding process is as described above.

Accordingly, a solution containing a reactant and a photocatalyst of a photochemical reaction introduced into a second inlet 25a of the second module structure 20 for photomicro-reactors is distributed along branch portions 23b of the second module structure 20 for photomicro-reactors, and then flows along first channels 13 of the plurality of first module structures 10 for photomicro-reactors and photochemically reacts.

Referring to FIG. 22B, it can be confirmed that a conversion rate of a photochemical reaction performed in a single flow module (a single luminescent solar concentrator-based photomicro-reactor (LSC-PM)) and a conversion rate of a photochemical reaction and the radial assembly performed in each of a plurality of flow modules forming a radial assembly (radial LSC-PM) are equivalent.

In this way, in the photomicro-reactor according to the embodiment of the present invention, the radial assembly can increase the number of flow modules without reducing the conversion rate of the flow modules, and thus throughput of the photomicro-reactor can be increased.

Furthermore, the photomicro-reactor according to the embodiment of the present invention may include both of a plurality of straight assemblies and a plurality of radial assemblies. Accordingly, high throughput and conversion rate of a photochemical reaction can be simultaneously achieved.

Referring to FIG. 23, in a system in which six straight assemblies (each straight assembly includes two first module structures for photomicro-reactors in series) are coupled to each other with respect to the second module structure for photomicro-reactors, it can be confirmed that, when a fluid having an amount of flow of 20 mL/min and a pressure of 55.5 Pa is introduced into the second inlet of the second module structure for photomicro-reactors, the fluid flows through the channel under a stable pressure resistance. These results indicate that the photomicro-reactor including a system in which the straight assembly and the radial assembly are coupled can be stably applied to a system for a photochemical reaction.

As described above, in the module structure for photomicro-reactors, the photomicro-reactor including the same, and the method of manufacturing the same according to the embodiment of the present invention, by identifying the chemical resistance of the resin against the organic solvent and the organic dye-based photocatalyst and manufacturing the photomicro-reactor using the resin having the identified chemical resistance, the module structure can be compatible with various organic photocatalysts or organic solvents.

Further, since the module structure for photomicro-reactors can be manufactured using a 3D printing method suitable for manufacturing small complex devices and does not require high skill in the manufacturing process, a time and costs invested in the manufacturing process can be reduced.

Further, by configuring the photomicro-reactor using the plurality of module structures for photomicro-reactors made miniaturized and modular and controlling their arrangement, the conversion rate and throughput of the photochemical reaction can be increased.

Further, since a plurality of module structures for photomicro-reactors include magnet members for coupling and are coupled by a magnetic force thereof, the plurality of module structures for photomicro-reactors can be easily arranged and coupled.

In a module structure for photomicro-reactors and a method of manufacturing a photomicro-reactor including the same according to embodiments of the present invention, chemical resistance of a resin against an organic solvent and an organic dye-based photocatalyst is identified, and the module structure for photomicro-reactors is manufactured using the resin having the identified chemical resistance, and thus it is possible to provide a module structure for photomicro-reactors compatible with various organic photocatalysts or organic solvents and a photomicro-reactor including the same.

Further, in the module structure for photomicro-reactors and the method of manufacturing the photomicro-reactor including the same according to embodiments of the present invention, the module structure for photomicro-reactors is manufactured using a 3D printing method that is suitable for manufacturing complex small devices and does not require high skill, a time and costs invested in a manufacturing process of the module structure for photomicro-reactors and the photomicro-reactor including the same can be reduced.

Further, since the photomicro-reactor according to the embodiment of the present invention is composed of a plurality of miniaturized module structures for photomicro-reactors of which an arrangement can be adjusted, a conversion rate and throughput of a photochemical reaction can be improved.

Further, in the module structure for photomicro-reactors and the method of manufacturing the photomicro-reactor including the same according to embodiments of the present invention, by optimizing design parameters of the module structure for photomicro-reactors, it is possible to improve a conversion rate of a photochemical reaction.

Further, in the module structure for photomicro-reactors according to the embodiment of the present invention and the photomicro-reactor including the same, since O-rings are installed at an outlet and an inlet and the module structures for photomicro-reactors are coupled to each other by a magnet member provided at a position adjacent to the outlet and the inlet, the plurality of module structures for photomicro-reactors can be arranged by themselves, and a leakage of a fluid that can occur between the module structures can be prevented.

Effects of the present invention are not limited to the above-described effects and other effects that are not described may be clearly understood by those skilled in the art from this specification and the accompanying drawings.

While the present invention has been described with reference to exemplary embodiments thereof, the spirit of the present invention is not limited to the embodiments presented in this specification. Those skilled in the art who understand the spirit of the present invention may easily suggest other embodiments by adding, changing, or removing elements within the scope of the same concept, and the other embodiments are also within the spirit of the present invention.

What is claimed is:

1. A method of manufacturing a module structure for photomicro-reactors inside which a reactant and a photocatalyst flow and photochemically react, the method comprising:
    mixing a polymer and a photoinitiator to prepare a photocurable resin;
    exposing one region of a surface of the photocurable resin to ultraviolet light to form a unit layer having a predetermined thickness;
    placing the photocurable resin on an upper side of the unit layer; and
    forming and stacking a plurality of the unit layers by repeatedly performing the forming of the unit layer and the placing of the photocurable resin to form the module structure.

2. The method of claim 1, wherein, in the forming of the unit layer, an exposure time of the ultraviolet light ranges from 5 seconds to 7 seconds.

3. The method of claim 1, wherein, in the forming of the unit layer, an exposure intensity of the ultraviolet light ranges from 15 mW/cm$^2$ to 25 mW/cm$^2$.

4. The method of claim 1, wherein the polymer includes perfluoropolyether-urethane methacrylate.

5. The method of claim 1, wherein the photocurable resin further includes a fluorescent dye.

6. The method of claim 5, wherein a collecting of the fluorescent dye in the photocurable resin ranges from 5 ppm to 300 ppm.

7. The method of claim 5, wherein the fluorescent dye includes at least one of coumarin 6, eosin-Y, fluorescein, perylene, lumogen F red, and rhodamine 6G.

8. The method of claim 1, further comprising:
    identifying chemical resistance of the photocurable resin prepared in the preparing of the photocurable resin; and
    optimizing design parameters of the module structure for photomicro-reactors on the basis of the chemical resistance identified in the identifying of the chemical resistance.

9. The method of claim 8, further comprising:
    in the preparing of the photocurable resin, preparing a plurality of photocurable resins in which at least one of the polymer and the photoinitiator is different; and
    after the identifying of the chemical resistance is performed, selecting any one of the plurality of photocurable resins on the basis of the identified chemical resistance.

10. The method of claim 8, wherein the identifying of the chemical resistance includes:
preparing a sample using the photocurable resin;
exposing the sample to a solvent or an organic dye-based photocatalyst; and
identifying physical and chemical properties of the sample, the solvent, or the organic dye-based photocatalyst.

11. The method of claim 8, wherein the optimizing of the design parameters includes:
preparing a plurality of test subjects in which the design parameters are changed based on the identified chemical resistance;
identifying photochemical reaction efficiencies of the plurality of test subjects; and
optimizing the design parameters on the basis of the identified efficiencies.

12. A module structure for photomicro-reactors manufactured by the method according to claim 1, the module structure comprising:
a light collecting plate having one side provided with an inlet through which a reactant and a photocatalyst are introduced, and the other side provided with an outlet through which a product generated by a photochemical reaction and the photocatalyst are discharged;
a channel formed inside the light collecting plate and connecting the inlet and the outlet;
a first coupling portion formed on one side portion of the light collectin plate; and
a second coupling portion formed on the other side portion of the light collectin plate,
wherein the first coupling portion includes a first body that protrudes upward from the one side of the light collectin plate,
wherein the inlet is positioned at a side surface of the first body and includes a first magnet member provided in the first body to be adjacent to the first inlet,
wherein the second coupling portion includes a second body that protrudes upward from the other side of the light collectin plate, and
wherein the outlet is positioned at a side surface of the second body and includes a second magnet member provided in the second body to be adjacent to the outlet.

13. The module structure of claim 12, wherein the light collecting plate is formed to have a polygonal plate shape.

14. The module structure of claim 12, wherein a sealing member is provided at at least one of the inlet and the outlet.

15. The module structure of claim 12, wherein:
the inlet is positioned at an upper surface of the light collecting plate;
the outlet is provided as a plurality of outlets;
the plurality of outlets are positioned at side surfaces of the light collecting plate; and
the channel includes branch portions branched off from the inlet toward the plurality of outlets.

16. The module structure of claim 12, wherein:
the inlet is positioned at one side surface of the light collecting plate;
the outlet is positioned at the other side surface of the light collecting plate; and
the channel is formed so that a plurality of rows constituting one flow path between the outlet and the inlet are arranged in a zigzag manner.

17. A photomicro-reactor comprising a plurality of first module structures and a second module structure for photomicro-reactors inside which a reactant and a photocatalyst flow and photochemically react,
wherein each of the first module structures for photomicro-reactors includes:
a first light collecting plate having one side provided with a first inlet through which the reactant and the photocatalyst are introduced, and the other side provided with a first outlet through which a product generated by the photochemical reaction and the photocatalyst are discharged; and
a first channel formed inside the first light collecting plate and through which the first inlet and the first outlet are connected, and
at least two of the plurality of first module structures for photomicro-reactors are coupled to each other so that any one first outlet of the plurality of first module structures for photomicro-reactors is connected to another first inlet of the plurality of first module structures for photomicro-reactors,
wherein the second module structure for photomicro-reactors includes:
a second light collecting plate having an upper surface provided with a second inlet through which the reactant and the photocatalyst are introduced, and side surfaces provided with a plurality of second outlets through which a product generated by the photochemical reaction and the photocatalyst are discharged; and
a second channel formed to be branched off from the second inlet toward the plurality of second outlets and connecting the second inlet to the plurality of second outlets, and
at least two of the plurality of first module structures for photomicro-reactors are radially coupled to the second module structure for photomicro-reactors so that any one of the plurality of second outlets is connected to any one the first inlet of the plurality of first module structures for photomicro-reactors.

18. The photomicro-reactor of claim 17, wherein, in each of the first module structures for photomicro-reactors:
the first inlet is positioned at one side surface of the first light collecting plate;
the first outlet is positioned at the other side surface of the first light collecting plate;
a first coupling portion is formed on one side portion of the first light collecting plate;
a second coupling portion to be coupled to the first coupling portion of the neighboring first module structure for photomicro-reactors is formed on the other side portion of the first light collecting plate; and
at least two of the plurality of first module structures for photomicro-reactors are coupled in a line.

19. The photomicro-reactor of claim 18, wherein:
the first coupling portion includes a first body that protrudes upward from the one side of the first light collecting plate, wherein the first inlet is positioned at a side surface of the first body and includes a first magnet member provided in the first body to be adjacent to the first inlet; and
the second coupling portion includes a second body that protrudes upward from the other side of the first light collecting plate, wherein the first outlet is positioned at a side surface of the second body and includes a second magnet member provided in the second body to be adjacent to the first outlet.

* * * * *